(12) United States Patent
Miyashita et al.

(10) Patent No.: US 8,254,234 B2
(45) Date of Patent: Aug. 28, 2012

(54) INFORMATION RECORDING MEDIUM EVALUATION METHOD, INFORMATION RECORDING MEDIUM, METHOD FOR MANUFACTURING INFORMATION RECORDING MEDIUM, SIGNAL PROCESSING METHOD AND ACCESS CONTROL APPARATUS

(75) Inventors: Harumitsu Miyashita, Nara (JP); Kohei Nakata, Nara (JP)

(73) Assignee: Panasonic Corporation, Osaka (JP)

( * ) Notice: Subject to any disclaimer, the term of this patent is extended or adjusted under 35 U.S.C. 154(b) by 0 days.

(21) Appl. No.: 13/207,570

(22) Filed: Aug. 11, 2011

(65) Prior Publication Data

US 2011/0292780 A1   Dec. 1, 2011

Related U.S. Application Data

(60) Continuation of application No. 12/910,091, filed on Oct. 22, 2010, now abandoned, which is a division of application No. 11/964,825, filed on Dec. 27, 2007, now abandoned.

(60) Provisional application No. 60/882,244, filed on Dec. 28, 2006.

(51) Int. Cl.
   *G11B 7/004* (2006.01)
(52) U.S. Cl. ...................... 369/59.22; 714/794
(58) Field of Classification Search ............... 369/59.22, 369/59.21, 59.23, 59.26, 47.18, 53.23; 714/794; 375/262, 341
See application file for complete search history.

(56) References Cited

U.S. PATENT DOCUMENTS

| 5,488,591 | A | * | 1/1996 | Kobayashi et al. | 369/13.02 |
| 5,604,724 | A | * | 2/1997 | Shiokawa | 369/59.22 |
| 5,621,710 | A | * | 4/1997 | Koo | 369/47.4 |
| 5,872,754 | A | * | 2/1999 | Taguchi et al. | 369/59.14 |
| 6,335,913 | B1 | * | 1/2002 | Okamoto | 369/59.22 |
| 6,426,926 | B1 | * | 7/2002 | Sonu | 369/47.17 |

(Continued)

FOREIGN PATENT DOCUMENTS

CN    1392539 A    1/2003

(Continued)

OTHER PUBLICATIONS

Ohmsha Ltd.; "Illustrated Blu-ray Disc Reader"; Dec. 10, 2006; pp. 144-155 and pp. 246-247. (partial English translation provided).

(Continued)

*Primary Examiner* — Thomas Alunkal
(74) *Attorney, Agent, or Firm* — Renner, Otto, Boisselle & Sklar, LLP

(57) ABSTRACT

A method for rating an information recording medium according to the present invention includes the steps of: receiving a digital read signal, which has been generated based on an analog read signal representing information that has been read from the information recording medium, and shaping the waveform of the digital read signal; subjecting the shaped digital read signal to maximum likelihood decoding, thereby generating a binarized signal showing a result of the maximum likelihood decoding; and calculating the quality of the digital read signal based on the shaped digital read signal and the binarized signal. If the quality of the read signal is calculated by a PRML method in which a number of zero-cross portions are included in a merging path of a minimum difference metric, the quality is calculated by using only a state transition pattern in which only one zero-cross portion is included in a merging path of a non-minimum difference metric.

2 Claims, 15 Drawing Sheets

U.S. PATENT DOCUMENTS

| | | | |
|---|---|---|---|
| 6,751,774 B2 * | 6/2004 | Aziz | 714/792 |
| 6,836,511 B1 * | 12/2004 | Marukawa | 375/232 |
| 2002/0064108 A1 * | 5/2002 | Miyashita et al. | 369/47.35 |
| 2003/0002420 A1 | 1/2003 | Yoon et al. | |
| 2003/0021208 A1 * | 1/2003 | Ogura | 369/59.22 |
| 2003/0067998 A1 | 4/2003 | Nakajima et al. | |
| 2003/0091781 A1 | 5/2003 | Arakawa et al. | |
| 2003/0151988 A1 * | 8/2003 | Katayama | 369/44.32 |
| 2004/0095860 A1 | 5/2004 | Ariyoshi et al. | |
| 2004/0141432 A1 | 7/2004 | Toda et al. | |
| 2004/0208101 A1 | 10/2004 | Ohkubo et al. | |
| 2004/0253539 A1 | 12/2004 | Uno et al. | |
| 2005/0078579 A1 | 4/2005 | Miyashita et al. | |
| 2005/0190678 A1 * | 9/2005 | Ide | 369/59.22 |
| 2005/0249318 A1 | 11/2005 | Minemura | |
| 2005/0259551 A1 | 11/2005 | Kudo et al. | |
| 2005/0270939 A1 | 12/2005 | Kashihara et al. | |
| 2006/0015797 A1 * | 1/2006 | Miyaoka | 714/794 |
| 2006/0038875 A1 | 2/2006 | Ichimura | |
| 2006/0072434 A1 | 4/2006 | Shintani et al. | |
| 2006/0083337 A1 * | 4/2006 | Higashino | 375/341 |
| 2007/0109939 A1 * | 5/2007 | Shimizu et al. | 369/59.22 |

FOREIGN PATENT DOCUMENTS

| | | |
|---|---|---|
| CN | 1707632 A | 7/2003 |
| CN | 1433009 A | 12/2005 |
| CN | 1750149 A | 3/2006 |
| EP | 1 603 127 A2 | 12/2005 |
| EP | 1 647 976 A1 | 4/2006 |
| EP | 1 688 937 A2 | 8/2006 |
| EP | 1 727 139 A1 | 11/2006 |
| JP | 09-161272 | 6/1997 |
| JP | 10-106161 | 4/1998 |
| JP | 2002-230904 | 8/2002 |
| JP | 2003-141823 | 5/2003 |
| JP | 2003-141823 A | 5/2003 |
| JP | 2004-213862 | 7/2004 |
| JP | 2004-335079 | 11/2004 |
| JP | 2006-164318 | 6/2006 |
| JP | 2006-318531 | 11/2006 |

OTHER PUBLICATIONS

Baifukan Co., Ltd.; "Adaptive Signal Processing Algorithm"; Jul. 19, 2000; pp. 32-35 (partial English translation provided).

International Search Report for International Application No. PCT/JP2007/074968 mailed Mar. 4, 2008.

Form PCT/ISA/237 for International Application No. PCT/JP2007/074968 dated Mar. 4, 2008 and partial English translation provided.

Grandparent U.S. Appl. No. 11/964,825, filed Dec. 27, 2007 now abandoned.

Shiraishi et al., "Signal Quality Evaluation Method for Over-30-GB Blu-ray Discs", Japanese Journal of Applied Physics, vol. 45, No. 2B, Feb. 2006, pp. 1066-1070.

Extended European Search Report for corresponding European patent Application No. 07860197.8 mailed Jun. 8, 2011.

Parent U.S. Appl. No. 12/910,091, filed Oct. 22, 2011.

Russian Office Action for corresponding Russian Application No. 2009103766 dated Aug. 30, 2011 (with English translation).

Chinese Office Action for corresponding Chinese Application No. 200780030181.0 dated Mar. 21, 2012 (with partial English translation).

* cited by examiner

FIG.2 (1,7)RLL + PR(1,2,2,2,1)

TRACK 131   SHORTEST MARK 132   LIGHT BEAM SPOT 133

*FIG.15*
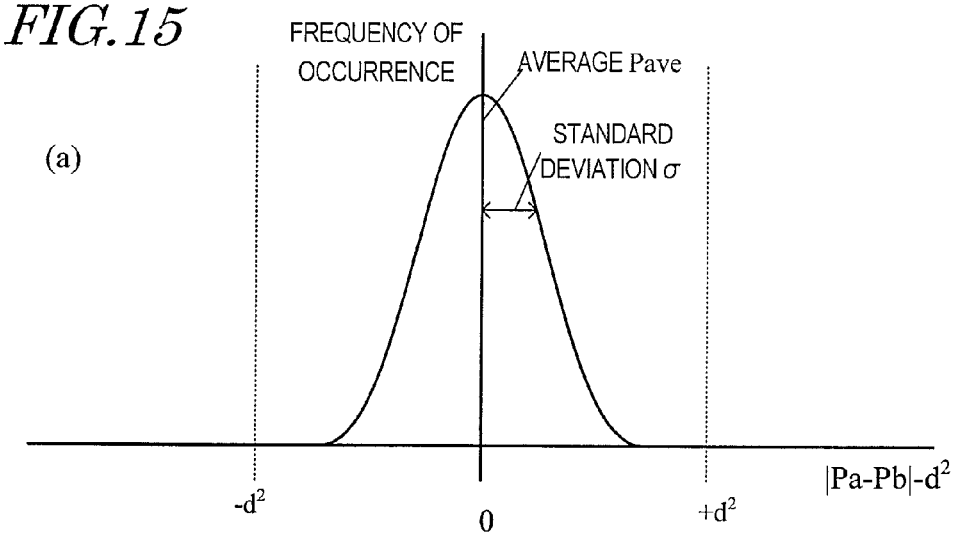
(a)
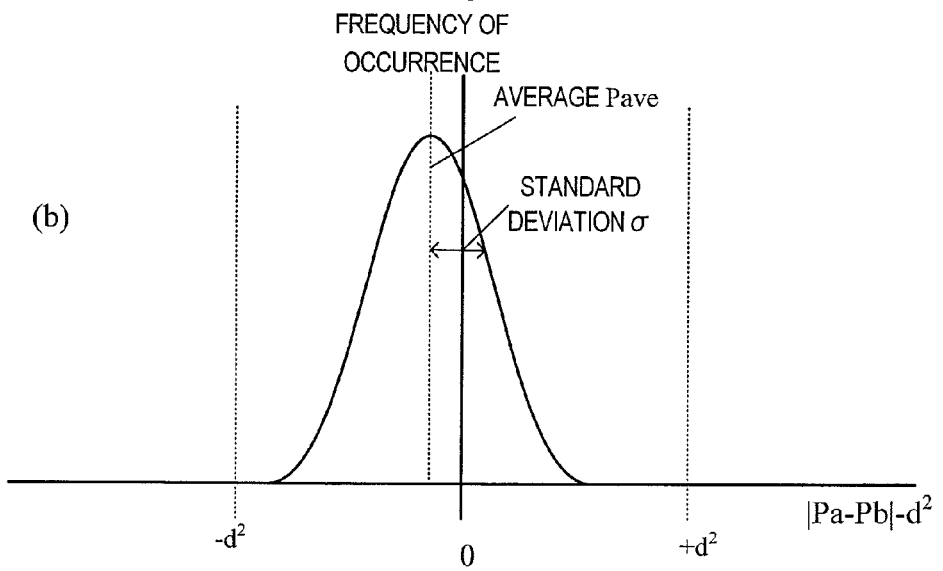
(b)
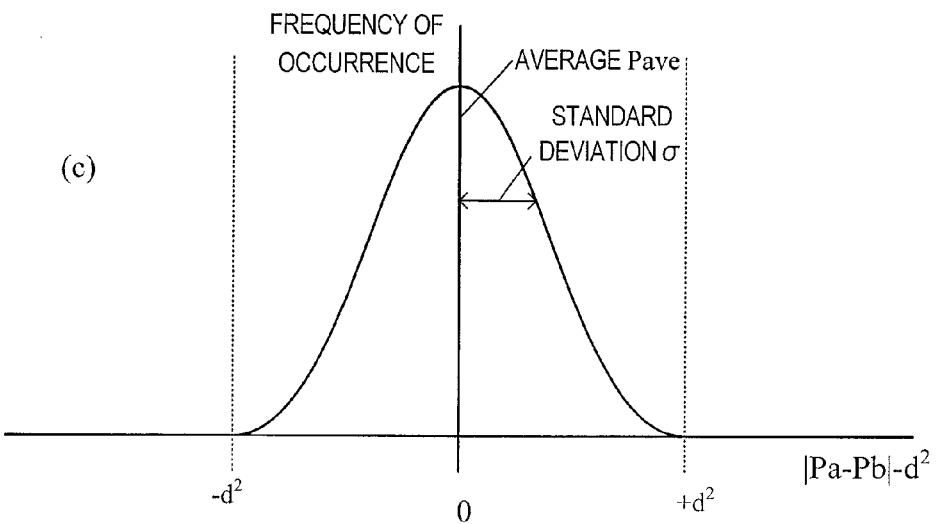
(c)

INFORMATION RECORDING MEDIUM EVALUATION METHOD, INFORMATION RECORDING MEDIUM, METHOD FOR MANUFACTURING INFORMATION RECORDING MEDIUM, SIGNAL PROCESSING METHOD AND ACCESS CONTROL APPARATUS

BACKGROUND OF THE INVENTION

1. Field of the Invention

The present invention relates to a signal processing method by maximum likelihood decoding and also relates to a method for rating an information recording medium by the maximum likelihood decoding.

2. Description of the Related Art

Recently, as the densities of optical disk media have been further increased, the shortest length of recording marks has come even closer to the limit of optical resolutions. As a result, intersymbol interference is occurring increasingly often and the SNR (signal to noise ratio) is decreasing even more significantly. To overcome these problems, it has become more and more common to adopt PRML (partial response maximum likelihood) as a signal processing method.

The PRML method is a combination of the partial response (PR) technique and the maximum likelihood (ML) technique, and is a method for selecting a most likely signal sequence based on a read signal waveform on the supposition that a known intersymbol interference should occur. Thus, it is known that decoding performance improves compared to the conventional level determination method (see, for example, Illustrated Blu-ray Disc Reader, Ohmsha, Ltd. (Non-Patent Document No. 1))

Meanwhile, as the level determination method has been gradually replaced by the PRML method as a mainstream signal processing method, some problems are arising about how to evaluate the read signal. Specifically, jitter has been used as an index for evaluating a read signal on the supposition that the signal processing technique is level determination, and therefore, may sometimes have no correlation with the decoding performance of the PRML method, which requires a different signal processing algorithm than that of the level determination. Thus, new indices that do have correlation with the decoding performance of the PRML method have been proposed (see, for example, Japanese Patent Application Laid-Open Publication No. 2003-141823 (Patent Document No. 1) and Japanese Patent Application Laid-Open Publication No. 2004-213862 (Patent Document No. 2)).

On the other hand, a new index that would contribute to detecting edge shifting between marks and spaces, which are very important factors that determine the storage quality of an optical disk medium, has also been proposed lately (see, for example, Japanese Patent Application Laid-Open Publication No. 2004-335079 (Patent Document No. 3)). As long as the PRML method is adopted, this index should also comply with the PRML rule and should also have correlation with the decoding performance of the PRML method. In addition, this index also needs to represent quantitatively the magnitude and direction of edge shifting on a pattern-by-pattern basis.

As described above, as the densities of optical disk media have been further increased, the intersymbol interference and SNR will have more and more serious consequences. Non-Patent Document No. 1 discloses that to maintain a system margin, the PRML methods need to be changed into a higher-order one. For example, if a 12 cm optical disk medium has a storage capacity of 25 GB per recording layer, the system margin can be maintained by adopting PR 1221 ML method. However, if the storage capacity per recording layer is 33.3 GB, then PR 12221 ML method should be adopted. It is expected that as the densities of optical disk media are further rising, the order of the PRML method to adopt should continue to get higher and higher in this manner.

An exemplary method for adjusting write parameters so as to generate the best read signal for maximum likelihood decoding is disclosed in Japanese Patent Application Laid-Open Publication No. 2004-335079 (Patent Document No. 3).

However, if such a high-order PRML method that would achieve high performance during a read operation were adopted and if adjustments were made during writing by that PRML method (particularly if the edge positions of recording marks are adjusted), then the write operation could not be performed with the write performance of the given recording medium taken full advantage of (e.g., under such a writing condition as to maximize the SNR) depending on the storage density of the medium, thus causing a decrease in the margin of the overall system. For example, if the PR 12221 ML method were adopted as the read signal processing method and if the best write adjustments were made for a PR 12221 ML read system, then 2T and 3T marks (where T is a channel width, or one period of a channel clock signal) as short recording marks would become too small to satisfy the best writing condition for the medium. As a result, the performance of repetitive writing might degrade too much and the deterioration with time might be noticeable too easily.

In addition, the read signals representing 2T, 3T and other short marks might have insufficient amplitudes, thus possibly causing deterioration in read performance due to a decrease in SNR or threatening the stability of a PLL circuit for detecting a sync signal from the read signal. That is to say, writing could be performed under such writing conditions as to decrease the read and write margins.

Also, if a higher-order PRML method is adopted to cope with the intersymbol interference that would be produced as the storage density is further increased (for example, PR 12221 ML is a higher order one than PR 1221 ML), the read signal waveform could be recognized with a waveform pattern of a longer interval in order to increase the resolution to determine the amplitude level of the read signal waveform and to identify the read signal even under the influence of the intersymbol interference. That is why confusing read signal patterns in the PR 12221 ML include patterns with multiple edges between marks and spaces. Naturally, these patterns are very useful in evaluating the read performance of the PRML method. If the pattern to evaluate included multiple edges, however, then it would be difficult to detect edge shifting between marks and spaces, which are very important factors that would determine the storage quality of an optical disk medium. In that case, the optical disk medium sometimes could not be rated appropriately.

An object of the present invention is to provide a good signal processing method and information recording medium evaluating method for such a system that adopts a high-order PRML method that would achieve high read performance. Another object of the present invention is to provide a method for adjusting writing conditions so as to maximize the system's margins.

SUMMARY OF THE INVENTION

A method for rating an information recording medium according to the present invention includes the steps of: receiving a digital read signal, which has been generated based on an analog read signal representing information that has been read from the information recording medium, and shaping the waveform of the digital read signal; subjecting the shaped digital read signal to maximum likelihood decoding, thereby generating a binarized signal showing a result of the maximum likelihood decoding; and calculating the quality of the digital read signal based on the shaped digital read signal and the binarized signal. If the quality is calculated by a PRML method in which a number of zero-cross portions are included in a merging path of a minimum difference metric, the quality is calculated by using only a state transition pattern in which only one zero-cross portion is included in a merging path of a non-minimum difference metric.

In one preferred embodiment of the present invention, the spatial frequency of the shortest mark that has been left on the information recording medium is higher than an OTF (optical transfer function) cutoff frequency.

In another preferred embodiment, the quality is calculated by further using an index that is defined to be the ratio of the center of a signal amplitude, associated with a combination of the longest mark and the longest space that have been left on the information recording medium, to the center of energy of the read signal waveform.

In a specific preferred embodiment, the PRML method is a PR 12221 ML method.

In still another preferred embodiment, at least one of the degree of SNR of the read signal and the degree of edge shifting thereof is determined by the quality calculated.

In this particular preferred embodiment, the degree of edge shifting of the read signal is determined by the average of a distribution of values representing the qualities calculated.

In an alternative preferred embodiment, the degree of SNR of the read signal is determined by the standard deviation of a distribution of values representing the qualities calculated.

An apparatus according to the present invention is designed to read and/or write information from/on an information recording medium to be rated by a method according to any of the preferred embodiments of the present invention described above.

An information recording medium according to the present invention is to be rated by a method according to any of the preferred embodiments of the present invention described above.

Another information recording medium according to the present invention includes: a substrate; a protective coating; and at least one recording layer, which is arranged between the substrate and the protective coating. If the information recording medium is rated by a PRML method in which a number of zero-cross portions are included in a merging path of a minimum difference metric, the medium is rated by using only a state transition pattern in which only one zero-cross portion is included in a merging path of a non-minimum difference metric.

In one preferred embodiment of the present invention, the at least one recording layer includes two or more recording layers, and the recording medium has a storage linear density of 31 GB or more per recording layer.

In this particular preferred embodiment, the storage linear density per recording layer is 31.8 GB or more.

In a specific preferred embodiment, the storage linear density per recording layer is approximately 33.3 GB.

In another preferred embodiment, the at least one recording layer includes three or more recording layers.

In this particular preferred embodiment, the storage linear density of the three recording layers combined is approximately 100 GB.

In still another preferred embodiment, an objective lens for use to rate the information recording medium has a numerical aperture of 0.7 to 0.9.

In a specific preferred embodiment, the objective lens has a numerical aperture of 0.85.

In yet another preferred embodiment, a laser beam for use to rate the information recording medium has a wavelength of 410 nm or less.

In a specific preferred embodiment, the laser beam has a wavelength of 405 nm.

In yet another preferred embodiment, the substrate has a thickness of 1.1 mm.

In yet another preferred embodiment, the protective coating has a thickness of 10 μm to 200 μm.

In a specific preferred embodiment, the protective coating has a thickness of 100 μm or less.

Another apparatus according to the present invention is designed to read and/or write information from/on an information recording medium according to any of the preferred embodiments of the present invention described above.

A method of making an information recording medium according to the present invention includes the steps of: making a stamper to form pits and/or grooves on an information recording medium; and forming pits and/or grooves on the substrate of the information recording medium using the stamper. If the information recording medium made by this method is rated by a PRML method in which a number of zero-cross portions are included in a merging path of a minimum difference metric, the medium is rated by using only a state transition pattern in which only one zero-cross portion is included in a merging path of a non-minimum difference metric.

In one preferred embodiment of the present invention, the pits are depressed when the information recording medium is viewed from a light source that irradiates the medium with a laser beam.

In an alternative preferred embodiment, the pits are raised when the information recording medium is viewed from a light source that irradiates the medium with a laser beam.

In another preferred embodiment, land portions and groove portions are defined on the substrate by the grooves. The groove portions are located farther away from the light source that irradiates the information recording medium with the laser beam than the land portions are. When information is written on the information recording medium, marks are left on the groove portions of the information recording medium.

In an alternative preferred embodiment, land portions and groove portions are defined on the substrate by the grooves. The land portions are located closer to the light source that irradiates the information recording medium with the laser beam than the groove portions are. When information is written on the information recording medium, marks are left on the land portions of the information recording medium.

Still another apparatus according to the present invention is designed to read and/or write information from/on an information recording medium made by a method according to any of the preferred embodiments of the present invention described above.

A signal processing method according to the present invention includes the steps of: receiving a digital read signal, which has been generated based on an analog read signal representing information that has been read from the information recording medium, and shaping the waveform of the digital read signal; subjecting the shaped digital read signal to maximum likelihood decoding, thereby generating a binarized signal showing a result of the maximum likelihood decoding; and calculating the quality of the digital read signal based on the shaped digital read signal and the binarized signal. If the quality is calculated by a PRML method in which a number of zero-cross portions are included in a merging path of a minimum difference metric, the quality is calculated by using only a state transition pattern in which only one zero-cross portion is included in a merging path of a non-minimum difference metric.

In one preferred embodiment of the present invention, the quality is calculated by further using an index that is defined to be the ratio of the center of a signal amplitude, associated with a combination of the longest mark and the longest space that have been left on the information recording medium, to the center of energy of the read signal waveform.

In another preferred embodiment, the quality is calculated by classifying the read signals according to a combination of lengths of marks and spaces that have been left on the information recording medium.

In a specific preferred embodiment, the shortest lengths of the marks and the spaces are both equal to 2T.

Yet another apparatus according to the present invention is designed to read and/or write information from/on an information recording medium rated by a method according to any of the preferred embodiments of the present invention described above.

Yet another information recording medium according to the present invention is rated by a signal processing method according to any of the preferred embodiments of the present invention described above.

An access controller according to the present invention includes: a shaping section, which receives a digital read signal, which has been generated based on an analog read signal representing information that has been read from an information recording medium, and shapes the waveform of the digital read signal; a maximum likelihood decoding section for subjecting the shaped digital read signal to maximum likelihood decoding, thereby generating a binarized signal showing a result of the maximum likelihood decoding; a calculating section for calculating the quality of the digital read signal based on the shaped digital read signal and the binarized signal; and a modifying section for modifying conditions to access the information recording medium based on the quality calculated. The shaping section and the maximum likelihood decoding section change the methods of signal processing to perform according to the type of the access from a first PRML method with a first characteristic into a second PRML method with a second characteristic, which is different from the first characteristic, and vice versa.

In one preferred embodiment of the present invention, compared to the first characteristic, the second characteristic is a non-treble-boosted one.

In another preferred embodiment, when information is written on the information recording medium, the shaping section and the maximum likelihood decoding section perform signal processing by the first PRML method.

In still another preferred embodiment, the access controller further includes a control section for controlling the operations of the calculating section and the modifying section. When the shaping section and the maximum likelihood decoding section perform signal processing by the first PRML method, the control section instructs the calculating section and the modifying section to follow the first PRML method. When the shaping section and the maximum likelihood decoding section perform signal processing by the second PRML method, the control section instructs the calculating section and the modifying section to follow the second PRML method.

According to the present invention, if the quality of a given read signal is calculated by a PRML method in which a number of zero-cross portions are included in a merging path of a minimum difference metric, the quality is calculated by using only a state transition pattern in which only one zero-cross portion is included in a merging path of a non-minimum difference metric. By using such a state transition pattern in which only one zero-cross portion is included in a merging path, the error of each and every zero-cross portion (i.e., zero-cross information) can be detected separately and independently of each other. And by rating each zero-cross portion of the read signal on an individual basis, the quality of the read signal can be rated appropriately.

In addition, according to the present invention, by changing the PRML methods to adopt depending on the purpose of the access, the system margin can be maximized and the system can be stabilized. For example, if a normal read operation is carried out by a high-order PRML method that would achieve high read performance but if a read operation that needs to be done with write parameters adjusted is carried out by a PRML method that would adjust the write parameters with the property of the optical disk medium taken into account, the system margin can be maximized during both read and write operations. As a result, the read/write system can get stabilized.

BRIEF DESCRIPTION OF THE DRAWINGS

FIG. 15 shows the distributions of signal quality rating indices according to a preferred embodiment of the present invention.

DETAILED DESCRIPTION OF PREFERRED EMBODIMENTS

Figure 1:
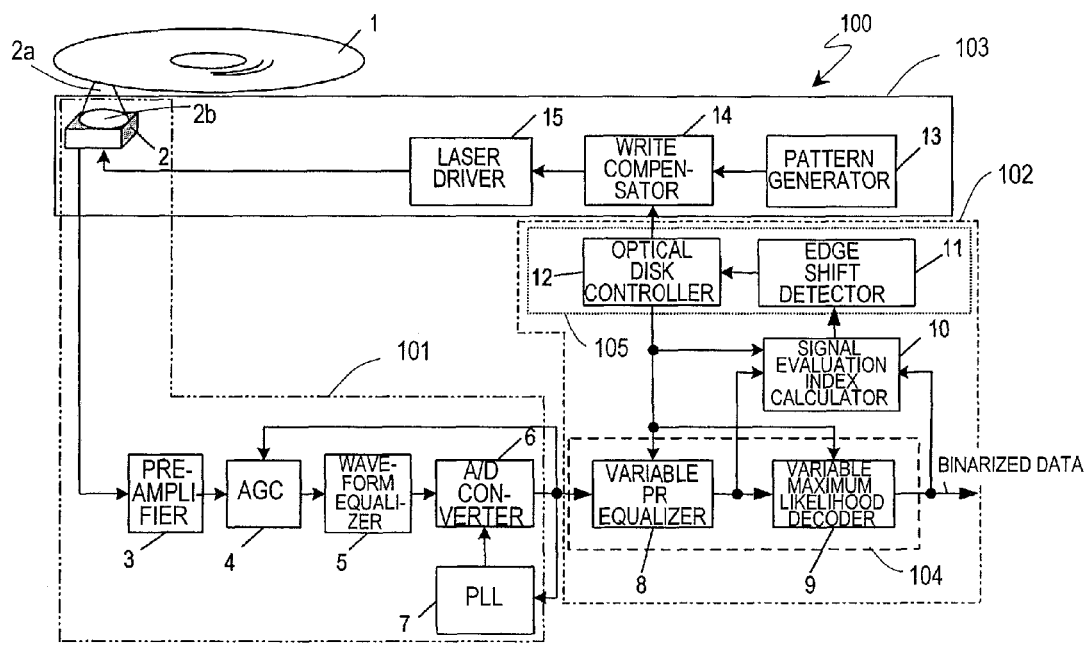
FIG. 1 illustrates an optical disk drive according to a preferred embodiment of the present invention.

Hereinafter, preferred embodiments of the present invention will be described with reference to the accompanying drawings. In the drawings, any pair of components shown in multiple sheets and having substantially the same function is identified by the same reference numeral. And once a component has been described, the description of its counterpart will be omitted herein to avoid redundancies.

First of all, it will be described how to adjust write parameters (e.g., how to adjust the edge positions of marks and spaces, among other things) by a PRML method according to a preferred embodiment of the present invention. As an exemplary method for adjusting write parameters is disclosed in Patent Document No. 3, only important points that have a lot to do with the present invention will be described. The entire disclosure of Patent Document No. 3 (Japanese Patent Application Laid-Open Publication No. 2004-335079) is hereby incorporated by reference.

In short, according to the present invention, the PR 12221 ML method is adopted to get signal processing done by the read system of a read/write system and a run length limited (RLL) code such as RLL (1, 7) is used as a recording code.

Figure 2:
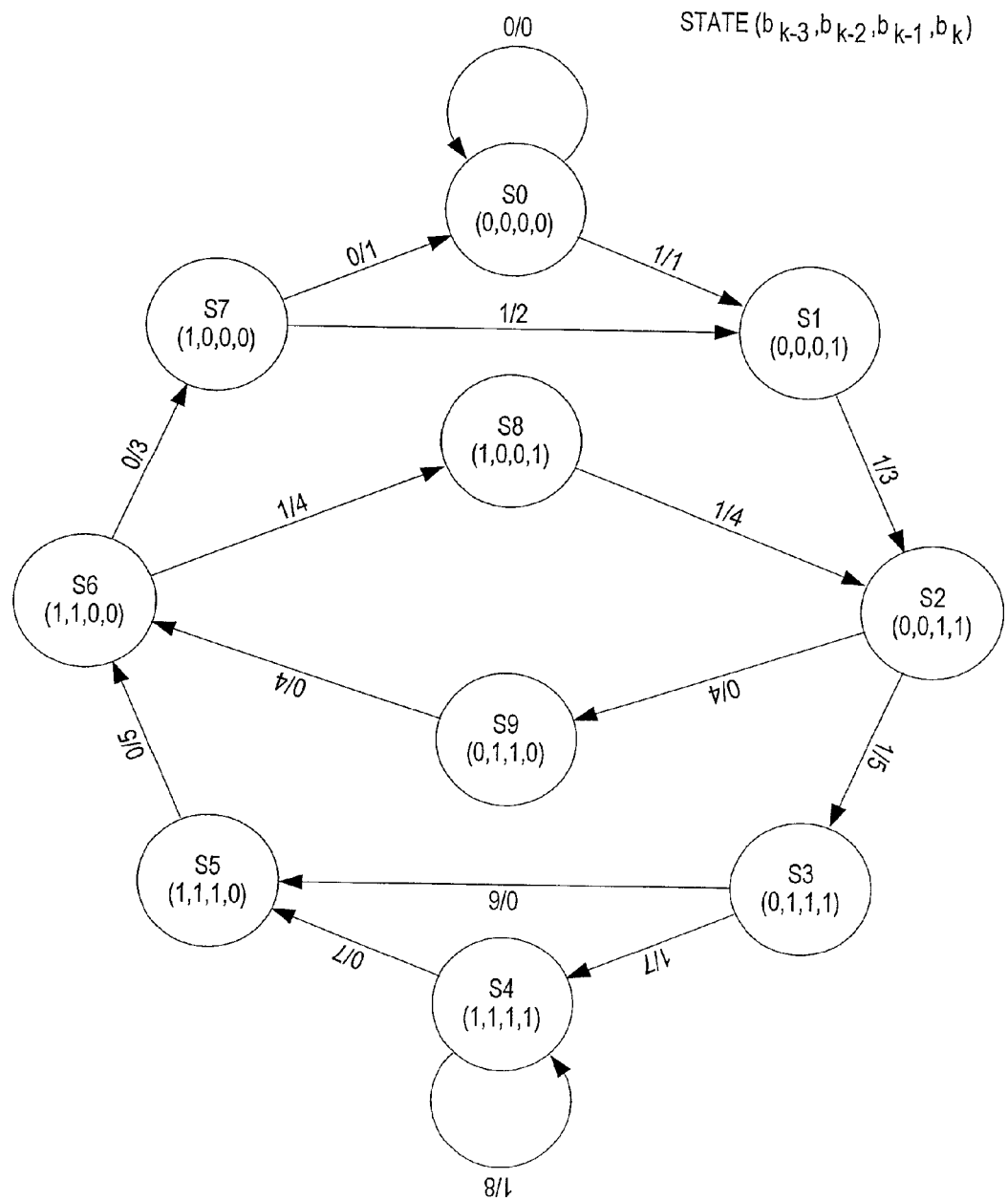
FIG. 2 shows state transition rules defined by a combination of RLL (1, 7) recording code and PR (1, 2, 2, 2, 1) equalization in a preferred embodiment of the present invention.
Figure 3:
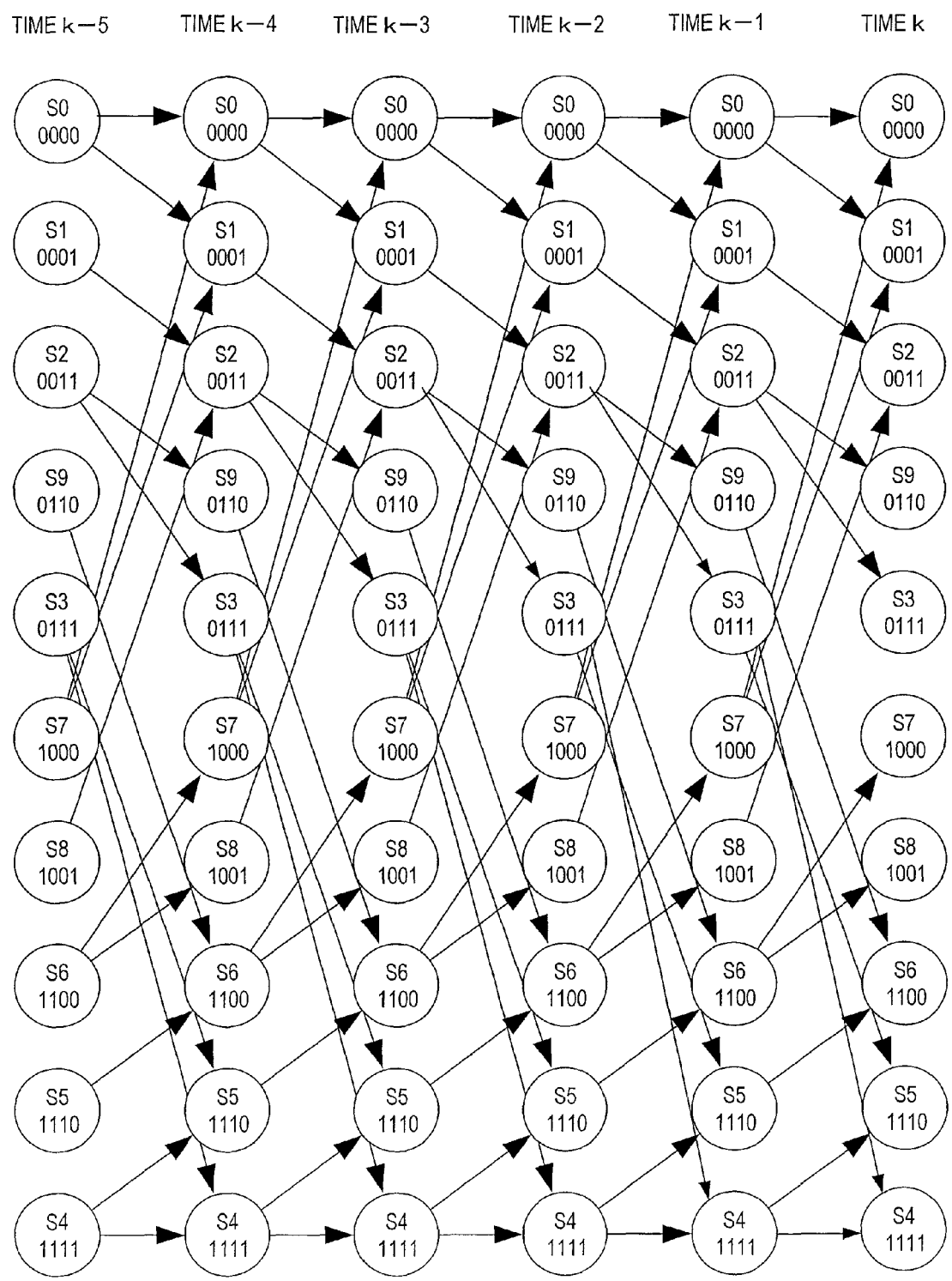
FIG. 3 is a trellis diagram corresponding to the state transition rules shown in FIG. 2.

Hereinafter, it will be described briefly with reference to FIGS. 2 and 3 what the PR 12221 ML method is. FIG. 2 is a state transition diagram showing state transition rules to be determined by the combination of the RLL (1, 7) recording code and equalization method PR (1, 2, 2, 2, 1). FIG. 3 is a trellis diagram representing the state transition rules shown in FIG. 2.

By combining PR 12221 ML and RLL (1, 7), the number of possible states of the decoding section is reduced to 10, the number of state transition paths becomes 16, and there are 9 read signal levels.

According to the state transition rules of the PR 12221 ML method shown in FIG. 2, ten states are represented by identifying, at a certain point in time, a state S (0, 0, 0, 0) by S0, a state S (0, 0, 0, 1) by S1, a state S (0, 0, 1, 1) by S2, a state S (0, 1, 1, 1) by S3, a state S (1, 1, 1, 1) by S4, a state S (1, 1, 1, 0) by S5, a state S (1, 1, 0, 0) by S6, a state S (1, 0, 0, 0) by S7, a state S (1, 0, 0, 1) by S8, and a state S (0, 1, 1, 0) by S9, respectively, where zero or one in the parentheses represents a signal sequence on the time axis and shows what state could be produced as a result of the next state transition from the current state. Also, if this state transition diagram is extended along the time axis, the trellis diagram shown in FIG. 3 can be obtained.

In the state transitions of PR 12221 ML shown in FIG. 3, there are an infinite number of state transition patterns (i.e., combinations of states) that can take two state transition paths in making a transition from a particular state at a certain point in time into another particular state at the next point in time. If we pay attention to only patterns that are particularly likely to produce errors in a certain time range, the state transition patterns of PR 12221 ML may be summarized as in the following Tables 1, 2 and 3:

TABLE 1

| state transition | recording code $(b_{k-i}, \ldots, b_k)$ | k−9 | k−8 | k−7 | k−6 | k−5 | k−4 | k−3 |
|---|---|---|---|---|---|---|---|---|
| $S0_{k-5} \to S6_k$ | (0, 0, 0, 0, 1, 1, 1, 0, 0) | | | | | S0 | S1 | S2 |
| | (0, 0, 0, 0, 0, 1, 1, 0, 0) | | | | | S0 | S0 | S1 |
| $S0_{k-5} \to S5_k$ | (0, 0, 0, 0, 1, 1, 1, 1, 0) | | | | | S0 | S1 | S2 |
| | (0, 0, 0, 0, 0, 1, 1, 1, 0) | | | | | S0 | S0 | S1 |
| $S0_{k-5} \to S4_k$ | (0, 0, 0, 0, 1, 1, 1, 1, 1) | | | | | S0 | S1 | S2 |
| | (0, 0, 0, 0, 0, 1, 1, 1, 1) | | | | | S0 | S0 | S1 |
| $S2_{k-5} \to S0_k$ | (0, 0, 1, 1, 1, 0, 0, 0, 0) | | | | | S2 | S3 | S5 |
| | (0, 0, 1, 1, 0, 0, 0, 0, 0) | | | | | S2 | S9 | S6 |
| $S2_{k-5} \to S1_k$ | (0, 0, 1, 1, 1, 0, 0, 0, 1) | | | | | S2 | S3 | S5 |
| | (0, 0, 1, 1, 0, 0, 0, 0, 1) | | | | | S2 | S9 | S6 |
| $S2_{k-5} \to S2_k$ | (0, 0, 1, 1, 1, 0, 0, 1, 1) | | | | | S2 | S3 | S5 |
| | (0, 0, 1, 1, 0, 0, 0, 1, 1) | | | | | S2 | S9 | S6 |
| $S3_{k-5} \to S0_k$ | (0, 1, 1, 1, 1, 0, 0, 0, 0) | | | | | S3 | S4 | S5 |
| | (0, 1, 1, 1, 0, 0, 0, 0, 0) | | | | | S3 | S5 | S6 |
| $S3_{k-5} \to S1_k$ | (0, 1, 1, 1, 1, 0, 0, 0, 1) | | | | | S3 | S4 | S5 |
| | (0, 1, 1, 1, 0, 0, 0, 0, 1) | | | | | S3 | S5 | S6 |
| $S3_{k-5} \to S2_k$ | (0, 1, 1, 1, 1, 0, 0, 1, 1) | | | | | S3 | S4 | S5 |
| | (0, 1, 1, 1, 0, 0, 0, 1, 1) | | | | | S3 | S5 | S6 |
| $S7_{k-5} \to S6_k$ | (1, 0, 0, 0, 1, 1, 1, 0, 0) | | | | | S7 | S1 | S2 |
| | (1, 0, 0, 0, 0, 1, 1, 0, 0) | | | | | S7 | S0 | S1 |
| $S7_{k-5} \to S5_k$ | (1, 0, 0, 0, 1, 1, 1, 1, 0) | | | | | S7 | S1 | S2 |
| | (1, 0, 0, 0, 0, 1, 1, 1, 0) | | | | | S7 | S0 | S1 |

TABLE 1-continued

| state transition | recording code | | | | | | | | k−2 | k−1 | k |
|---|---|---|---|---|---|---|---|---|---|---|---|
| $S7_{k-5} \to S4_k$ | (1, 0, 0, 0, 1, 1, 1, 1, 1) | | | | | | | | S7 | S1 | S2 |
| | (1, 0, 0, 0, 0, 1, 1, 1, 1) | | | | | | | | S7 | S0 | S1 |
| $S6_{k-5} \to S6_k$ | (1, 1, 0, 0, 1, 1, 1, 0, 0) | | | | | | | | S6 | S8 | S2 |
| | (1, 1, 0, 0, 0, 1, 1, 0, 0) | | | | | | | | S6 | S7 | S1 |
| $S6_{k-5} \to S5_k$ | (1, 1, 0, 0, 1, 1, 1, 1, 0) | | | | | | | | S6 | S8 | S2 |
| | (1, 1, 0, 0, 0, 1, 1, 1, 0) | | | | | | | | S6 | S7 | S1 |
| $S6_{k-5} \to S4_k$ | (1, 1, 0, 0, 1, 1, 1, 1, 1) | | | | | | | | S6 | S8 | S2 |
| | (1, 1, 0, 0, 0, 1, 1, 1, 1) | | | | | | | | S6 | S7 | S1 |
| $S4_{k-5} \to S0_k$ | (1, 1, 1, 1, 0, 0, 0, 0, 0) | | | | | | | | S4 | S4 | S5 |
| | (1, 1, 1, 1, 0, 0, 0, 0, 0) | | | | | | | | S4 | S5 | S6 |
| $S4_{k-5} \to S1_k$ | (1, 1, 1, 1, 0, 0, 0, 0, 1) | | | | | | | | S4 | S4 | S5 |
| | (1, 1, 1, 1, 0, 0, 0, 0, 1) | | | | | | | | S4 | S5 | S6 |
| $S4_{k-5} \to S2_k$ | (1, 1, 1, 1, 0, 0, 0, 1, 1) | | | | | | | | S4 | S4 | S5 |
| | (1, 1, 1, 1, 0, 0, 0, 1, 1) | | | | | | | | S4 | S5 | S6 |

| state transition | k−2 | k−1 | k | PR equalization ideal value | | | | Euclidean distance between paths |
|---|---|---|---|---|---|---|---|---|
| $S0_{k-5} \to S6_k$ | S3 | S5 | S6 | 1 | 3 | 5 | 6 | 5 |
| | S2 | S9 | S6 | 0 | 1 | 3 | 4 | 4 | 14 |
| $S0_{k-5} \to S5_k$ | S3 | S4 | S5 | 1 | 3 | 5 | 7 | 8 |
| | S2 | S3 | S5 | 0 | 1 | 3 | 5 | 7 | 14 |
| $S0_{k-5} \to S4_k$ | S3 | S4 | S4 | 1 | 3 | 5 | 7 | 8 |
| | S2 | S3 | S4 | 0 | 1 | 3 | 5 | 7 | 14 |
| $S2_{k-5} \to S0_k$ | S6 | S7 | S0 | 5 | 6 | 5 | 3 | 1 |
| | S7 | S0 | S0 | 4 | 4 | 3 | 1 | 0 | 14 |
| $S2_{k-5} \to S1_k$ | S6 | S7 | S1 | 5 | 6 | 5 | 3 | 2 |
| | S7 | S0 | S1 | 4 | 4 | 3 | 1 | 1 | 14 |
| $S2_{k-5} \to S2_k$ | S6 | S8 | S2 | 5 | 6 | 5 | 4 | 4 |
| | S7 | S1 | S2 | 4 | 4 | 3 | 2 | 3 | 14 |
| $S3_{k-5} \to S0_k$ | S6 | S7 | S0 | 7 | 7 | 5 | 3 | 1 |
| | S7 | S0 | S0 | 6 | 5 | 3 | 1 | 0 | 14 |
| $S3_{k-5} \to S1_k$ | S6 | S7 | S1 | 7 | 7 | 5 | 3 | 2 |
| | S7 | S0 | S1 | 6 | 5 | 3 | 1 | 1 | 14 |
| $S3_{k-5} \to S2_k$ | S6 | S8 | S2 | 7 | 7 | 5 | 4 | 4 |
| | S7 | S1 | S2 | 6 | 5 | 3 | 2 | 3 | 14 |
| $S7_{k-5} \to S6_k$ | S3 | S5 | S6 | 2 | 3 | 5 | 6 | 5 |
| | S2 | S9 | S6 | 1 | 1 | 3 | 4 | 4 | 14 |
| $S7_{k-5} \to S5_k$ | S3 | S4 | S5 | 2 | 3 | 5 | 7 | 7 |
| | S2 | S3 | S5 | 1 | 1 | 3 | 5 | 6 | 14 |
| $S7_{k-5} \to S4_k$ | S3 | S4 | S4 | 2 | 3 | 5 | 7 | 8 |
| | S2 | S3 | S4 | 1 | 1 | 3 | 5 | 7 | 14 |
| $S6_{k-5} \to S6_k$ | S3 | S5 | S6 | 4 | 4 | 5 | 6 | 5 |
| | S2 | S9 | S6 | 3 | 2 | 3 | 4 | 4 | 14 |
| $S6_{k-5} \to S5_k$ | S3 | S4 | S5 | 4 | 4 | 5 | 7 | 7 |
| | S2 | S3 | S5 | 3 | 2 | 3 | 5 | 6 | 14 |
| $S6_{k-5} \to S4_k$ | S3 | S4 | S4 | 4 | 4 | 5 | 7 | 8 |
| | S2 | S3 | S4 | 3 | 2 | 3 | 5 | 7 | 14 |
| $S4_{k-5} \to S0_k$ | S6 | S7 | S0 | 8 | 7 | 5 | 3 | 1 |
| | S7 | S0 | S0 | 7 | 5 | 3 | 1 | 0 | 14 |
| $S4_{k-5} \to S1_k$ | S6 | S7 | S1 | 8 | 7 | 5 | 3 | 2 |
| | S7 | S0 | S1 | 7 | 5 | 3 | 1 | 1 | 14 |
| $S4_{k-5} \to S2_k$ | S6 | S8 | S2 | 8 | 7 | 5 | 4 | 4 |
| | S7 | S1 | S2 | 7 | 5 | 3 | 2 | 3 | 14 |

TABLE 2

| state transition | recording code $(b_{k-i}, \ldots, b_k)$ | k−9 | k−8 | k−7 | k−6 | k−5 | k−4 | k−3 |
|---|---|---|---|---|---|---|---|---|
| $S0_{k-7} \to S0_k$ | (0, 0, 0, 0, 1, 1, 0, 0, 0, 0) | | | S0 | S1 | S2 | S9 | S6 |
| | (0, 0, 0, 0, 0, 1, 1, 0, 0, 0) | | | S0 | S0 | S1 | S2 | S9 |
| $S0_{k-7} \to S1_k$ | (0, 0, 0, 0, 1, 1, 0, 0, 0, 1) | | | S0 | S1 | S2 | S9 | S6 |
| | (0, 0, 0, 0, 0, 1, 1, 0, 0, 1) | | | S0 | S0 | S1 | S2 | S9 |
| $S0_{k-7} \to S2_k$ | (0, 0, 0, 0, 1, 1, 0, 0, 1, 1) | | | S0 | S1 | S2 | S9 | S6 |
| | (0, 0, 0, 0, 0, 1, 1, 0, 0, 1, 1) | | | S0 | S0 | S1 | S2 | S9 |
| $S2_{k-7} \to S6_k$ | (0, 0, 1, 1, 1, 0, 0, 1, 1, 0, 0) | | | S2 | S3 | S5 | S6 | S8 |
| | (0, 0, 1, 1, 0, 0, 1, 1, 0, 0) | | | S2 | S9 | S6 | S8 | S2 |
| $S2_{k-7} \to S5_k$ | (0, 0, 1, 1, 1, 0, 0, 1, 1, 1, 0) | | | S2 | S3 | S5 | S6 | S8 |
| | (0, 0, 1, 1, 0, 0, 1, 1, 1, 1, 0) | | | S2 | S9 | S6 | S8 | S2 |
| $S2_{k-7} \to S4_k$ | (0, 0, 1, 1, 1, 0, 0, 1, 1, 1, 1) | | | S2 | S3 | S5 | S6 | S8 |
| | (0, 0, 1, 1, 0, 0, 1, 1, 1, 1, 1) | | | S2 | S9 | S6 | S8 | S2 |
| $S3_{k-7} \to S6_k$ | (0, 1, 1, 1, 1, 0, 0, 1, 1, 0, 0) | | | S3 | S4 | S5 | S6 | S8 |
| | (0, 1, 1, 1, 0, 0, 1, 1, 0, 0) | | | S3 | S5 | S6 | S8 | S2 |
| $S3_{k-7} \to S5_k$ | (0, 1, 1, 1, 1, 0, 0, 1, 1, 1, 0) | | | S3 | S4 | S5 | S6 | S8 |
| | (0, 1, 1, 1, 0, 0, 1, 1, 1, 1, 0) | | | S3 | S5 | S6 | S8 | S2 |

TABLE 2-continued

| state transition | recording code | | | | | PR equalization ideal value | | | | | Euclidean distance between paths |
|---|---|---|---|---|---|---|---|---|---|---|---|
| $S3_{k-7} \to S4_k$ | (0, 1, 1, 1, 1, 0, 0, 1, 1, 1, 1) | | | | | S3 | S4 | S5 | S6 | S8 | |
| | (0, 1, 1, 1, 0, 0, 1, 1, 1, 1, 1) | | | | | S3 | S5 | S6 | S8 | S2 | |
| $S7_{k-7} \to S0_k$ | (1, 0, 0, 0, 1, 1, 0, 0, 0, 0, 0) | | | | | S7 | S1 | S2 | S9 | S6 | |
| | (1, 0, 0, 0, 0, 1, 1, 0, 0, 0, 0) | | | | | S7 | S0 | S1 | S2 | S9 | |
| $S7_{k-7} \to S1_k$ | (1, 0, 0, 0, 1, 1, 0, 0, 0, 0, 1) | | | | | S7 | S1 | S2 | S9 | S6 | |
| | (1, 0, 0, 0, 0, 1, 1, 0, 0, 0, 1) | | | | | S7 | S0 | S1 | S2 | S9 | |
| $S7_{k-7} \to S2_k$ | (1, 0, 0, 0, 1, 1, 0, 0, 0, 1, 1) | | | | | S7 | S1 | S2 | S9 | S6 | |
| | (1, 0, 0, 0, 0, 1, 1, 0, 0, 1, 1) | | | | | S7 | S0 | S1 | S2 | S9 | |
| $S6_{k-7} \to S0_k$ | (1, 1, 0, 0, 1, 1, 0, 0, 0, 0, 0) | | | | | S6 | S8 | S2 | S9 | S6 | |
| | (1, 1, 0, 0, 0, 1, 1, 0, 0, 0, 0) | | | | | S6 | S7 | S1 | S2 | S9 | |
| $S6_{k-7} \to S1_k$ | (1, 1, 0, 0, 1, 1, 0, 0, 0, 0, 1) | | | | | S6 | S8 | S2 | S9 | S6 | |
| | (1, 1, 0, 0, 0, 1, 1, 0, 0, 0, 1) | | | | | S6 | S7 | S1 | S2 | S9 | |
| $S6_{k-7} \to S2_k$ | (1, 1, 0, 0, 1, 1, 0, 0, 0, 1, 1) | | | | | S6 | S8 | S2 | S9 | S6 | |
| | (1, 1, 0, 0, 0, 1, 1, 0, 0, 1, 1) | | | | | S6 | S7 | S1 | S2 | S9 | |
| $S4_{k-7} \to S6_k$ | (1, 1, 1, 1, 1, 0, 0, 1, 1, 0, 0) | | | | | S4 | S4 | S5 | S6 | S8 | |
| | (1, 1, 1, 1, 0, 0, 1, 1, 1, 0, 0) | | | | | S4 | S5 | S6 | S8 | S2 | |
| $S4_{k-7} \to S5_k$ | (1, 1, 1, 1, 1, 0, 0, 1, 1, 1, 0) | | | | | S4 | S4 | S5 | S6 | S8 | |
| | (1, 1, 1, 1, 0, 0, 1, 1, 1, 1, 0) | | | | | S4 | S5 | S6 | S8 | S2 | |
| $S4_{k-7} \to S4_k$ | (1, 1, 1, 1, 1, 0, 0, 1, 1, 1, 1) | | | | | S4 | S4 | S5 | S6 | S8 | |
| | (1, 1, 1, 1, 0, 0, 1, 1, 1, 1, 1) | | | | | S4 | S5 | S6 | S8 | S2 | |

| state transition | k − 2 | k − 1 | k | PR equalization ideal value | | | | | | Euclidean distance between paths |
|---|---|---|---|---|---|---|---|---|---|---|
| $S0_{k-7} \to S0_k$ | S7 | S0 | S0 | 1 | 3 | 4 | 4 | 3 | 1 | 0 |
| | S6 | S7 | S0 | 0 | 1 | 3 | 4 | 4 | 3 | 1 | 12 |
| $S0_{k-7} \to S1_k$ | S7 | S0 | S1 | 1 | 3 | 4 | 4 | 3 | 1 | 1 |
| | S6 | S7 | S1 | 0 | 1 | 3 | 4 | 4 | 3 | 2 | 12 |
| $S0_{k-7} \to S2_k$ | S7 | S1 | S2 | 1 | 3 | 4 | 4 | 3 | 2 | 3 |
| | S6 | S8 | S2 | 0 | 1 | 3 | 4 | 4 | 4 | 4 | 12 |
| $S2_{k-7} \to S6_k$ | S2 | S9 | S6 | 5 | 6 | 5 | 4 | 4 | 4 | 4 |
| | S3 | S5 | S6 | 4 | 4 | 4 | 4 | 5 | 6 | 5 | 12 |
| $S2_{k-7} \to S5_k$ | S2 | S3 | S5 | 5 | 6 | 5 | 4 | 4 | 5 | 6 |
| | S3 | S4 | S5 | 4 | 4 | 4 | 4 | 5 | 7 | 7 | 12 |
| $S2_{k-7} \to S4_k$ | S2 | S3 | S4 | 5 | 6 | 5 | 4 | 4 | 5 | 7 |
| | S3 | S4 | S4 | 4 | 4 | 4 | 4 | 5 | 7 | 8 | 12 |
| $S3_{k-7} \to S6_k$ | S2 | S9 | S6 | 7 | 7 | 5 | 4 | 4 | 4 | 4 |
| | S3 | S5 | S6 | 6 | 5 | 4 | 4 | 5 | 6 | 5 | 12 |
| $S3_{k-7} \to S5_k$ | S2 | S3 | S5 | 7 | 7 | 5 | 4 | 4 | 5 | 6 |
| | S3 | S4 | S5 | 6 | 5 | 4 | 4 | 5 | 7 | 7 | 12 |
| $S3_{k-7} \to S4_k$ | S2 | S3 | S4 | 7 | 7 | 5 | 4 | 4 | 5 | 7 |
| | S3 | S4 | S4 | 6 | 5 | 4 | 4 | 5 | 7 | 8 | 12 |
| $S7_{k-7} \to S0_k$ | S7 | S0 | S0 | 2 | 3 | 4 | 4 | 3 | 1 | 0 |
| | S6 | S7 | S0 | 1 | 1 | 3 | 4 | 4 | 3 | 1 | 12 |
| $S7_{k-7} \to S1_k$ | S7 | S0 | S1 | 2 | 3 | 4 | 4 | 3 | 1 | 1 |
| | S6 | S7 | S1 | 1 | 1 | 3 | 4 | 4 | 3 | 2 | 12 |
| $S7_{k-7} \to S2_k$ | S7 | S1 | S2 | 2 | 3 | 4 | 4 | 3 | 2 | 3 |
| | S6 | S8 | S2 | 1 | 1 | 3 | 4 | 4 | 4 | 4 | 12 |
| $S6_{k-7} \to S0_k$ | S7 | S0 | S0 | 4 | 4 | 4 | 4 | 3 | 1 | 0 |
| | S6 | S7 | S0 | 3 | 2 | 3 | 4 | 4 | 3 | 1 | 12 |
| $S6_{k-7} \to S1_k$ | S7 | S0 | S1 | 4 | 4 | 4 | 4 | 3 | 1 | 1 |
| | S6 | S7 | S1 | 3 | 2 | 3 | 4 | 4 | 3 | 2 | 12 |
| $S6_{k-7} \to S2_k$ | S7 | S1 | S2 | 4 | 4 | 4 | 4 | 3 | 2 | 3 |
| | S6 | S8 | S2 | 3 | 2 | 3 | 4 | 4 | 4 | 4 | 12 |
| $S4_{k-7} \to S6_k$ | S2 | S9 | S6 | 8 | 7 | 5 | 4 | 4 | 4 | 4 |
| | S3 | S5 | S6 | 7 | 5 | 4 | 4 | 5 | 6 | 5 | 12 |
| $S4_{k-7} \to S5_k$ | S2 | S3 | S5 | 8 | 7 | 5 | 4 | 4 | 5 | 6 |
| | S3 | S4 | S5 | 7 | 5 | 4 | 4 | 5 | 7 | 7 | 12 |
| $S4_{k-7} \to S4_k$ | S2 | S3 | S4 | 8 | 7 | 5 | 4 | 4 | 5 | 7 |
| | S3 | S4 | S4 | 7 | 5 | 4 | 4 | 5 | 7 | 8 | 12 |

TABLE 3

| state transition | recording code $(b_{k-i}, \ldots, b_k)$ | k − 9 | k − 8 | k − 7 | k − 6 | k − 5 | k − 4 | k − 3 | k − 2 |
|---|---|---|---|---|---|---|---|---|---|
| $S0_{k-9} \to S6_k$ | (0, 0, 0, 0, 1, 1, 0, 0, 1, 1, 0, 0) | S0 | S1 | S2 | S9 | S6 | S8 | S2 | S3 |
| | (0, 0, 0, 0, 0, 1, 1, 0, 0, 1, 1, 0, 0) | S0 | S0 | S1 | S2 | S9 | S6 | S8 | S2 |
| $S0_{k-9} \to S5_k$ | (0, 0, 0, 0, 1, 1, 0, 0, 1, 1, 1, 0, 1) | S0 | S1 | S2 | S9 | S6 | S8 | S2 | S3 |
| | (0, 0, 0, 0, 0, 1, 1, 0, 0, 1, 1, 0, 1) | S0 | S0 | S1 | S2 | S9 | S6 | S8 | S2 |
| $S0_{k-9} \to S4_k$ | (0, 0, 0, 0, 1, 1, 0, 0, 1, 1, 1, 1, 1) | S0 | S1 | S2 | S9 | S6 | S8 | S2 | S3 |
| | (0, 0, 0, 0, 0, 1, 1, 0, 0, 1, 1, 1, 1) | S0 | S0 | S1 | S2 | S9 | S6 | S8 | S2 |
| $S2_{k-7} \to S0_k$ | (0, 0, 1, 1, 1, 0, 0, 1, 1, 0, 0, 0, 0) | S2 | S3 | S5 | S6 | S8 | S2 | S9 | S6 |
| | (0, 0, 1, 1, 0, 0, 1, 1, 0, 0, 0, 0, 0) | S2 | S9 | S6 | S8 | S2 | S9 | S6 | S7 |
| $S2_{k-7} \to S1_k$ | (0, 0, 1, 1, 1, 0, 0, 1, 1, 0, 0, 0, 1) | S2 | S3 | S5 | S6 | S8 | S2 | S9 | S6 |
| | (0, 0, 1, 1, 0, 0, 1, 1, 0, 0, 0, 0, 1) | S2 | S9 | S6 | S8 | S2 | S9 | S6 | S7 |

TABLE 3-continued

| state transition | | | | | | | | | | | | | | |
|---|---|---|---|---|---|---|---|---|---|---|---|---|---|---|
| $S2_{k-7} \to S2_k$ | (0, 0, 1, 1, 1, 0, 0, 1, 1, 0, 0, 1, 1) | S2 | S3 | S5 | S6 | S8 | S2 | S9 | S6 | | | | | |
| | (0, 0, 1, 1, 0, 0, 1, 1, 0, 0, 0, 1, 1) | S2 | S9 | S6 | S8 | S2 | S9 | S6 | S7 | | | | | |
| $S3_{k-5} \to S0_k$ | (0, 1, 1, 1, 1, 0, 0, 1, 1, 0, 0, 0, 0) | S3 | S4 | S5 | S6 | S8 | S2 | S9 | S6 | | | | | |
| | (0, 1, 1, 1, 0, 0, 1, 1, 0, 0, 0, 0, 0) | S3 | S5 | S6 | S8 | S2 | S9 | S6 | S7 | | | | | |
| $S3_{k-5} \to S1_k$ | (0, 1, 1, 1, 1, 0, 0, 1, 1, 0, 0, 0, 1) | S3 | S4 | S5 | S6 | S8 | S2 | S9 | S6 | | | | | |
| | (0, 1, 1, 1, 0, 0, 1, 1, 0, 0, 0, 0, 1) | S3 | S5 | S6 | S8 | S2 | S9 | S6 | S7 | | | | | |
| $S3_{k-5} \to S2_k$ | (0, 1, 1, 1, 1, 0, 0, 1, 1, 0, 0, 1, 1) | S3 | S4 | S5 | S6 | S8 | S2 | S9 | S6 | | | | | |
| | (0, 1, 1, 1, 0, 0, 1, 1, 0, 0, 0, 1, 1) | S3 | S5 | S6 | S8 | S2 | S9 | S6 | S7 | | | | | |
| $S3_{k-5} \to S2_k$ | (1, 0, 0, 0, 1, 1, 0, 0, 1, 1, 1, 0, 0) | S7 | S1 | S2 | S9 | S6 | S8 | S2 | S3 | | | | | |
| | (1, 0, 0, 0, 0, 1, 1, 0, 0, 1, 1, 0, 0) | S7 | S0 | S1 | S2 | S9 | S6 | S8 | S2 | | | | | |
| $S3_{k-5} \to S2_k$ | (1, 0, 0, 0, 1, 1, 0, 0, 1, 1, 1, 1, 0) | S7 | S1 | S2 | S9 | S6 | S8 | S2 | S3 | | | | | |
| | (1, 0, 0, 0, 0, 1, 1, 0, 0, 1, 1, 1, 0) | S7 | S0 | S1 | S2 | S9 | S6 | S8 | S2 | | | | | |
| $S3_{k-5} \to S2_k$ | (1, 0, 0, 0, 1, 1, 0, 0, 1, 1, 1, 1, 1) | S7 | S1 | S2 | S9 | S6 | S8 | S2 | S3 | | | | | |
| | (1, 0, 0, 0, 0, 1, 1, 0, 0, 1, 1, 1, 1) | S7 | S0 | S1 | S2 | S9 | S6 | S8 | S2 | | | | | |
| $S6_{k-5} \to S6_k$ | (1, 1, 0, 0, 1, 1, 0, 0, 1, 1, 1, 0, 0) | S6 | S8 | S2 | S9 | S6 | S8 | S2 | S3 | | | | | |
| | (1, 1, 0, 0, 0, 1, 1, 0, 0, 1, 1, 0, 0) | S6 | S7 | S1 | S2 | S9 | S6 | S8 | S2 | | | | | |
| $S6_{k-5} \to S5_k$ | (1, 1, 0, 0, 1, 1, 0, 0, 1, 1, 1, 1, 0) | S6 | S8 | S2 | S9 | S6 | S8 | S2 | S3 | | | | | |
| | (1, 1, 0, 0, 0, 1, 1, 0, 0, 1, 1, 1, 0) | S6 | S7 | S1 | S2 | S9 | S6 | S8 | S2 | | | | | |
| $S6_{k-5} \to S4_k$ | (1, 1, 0, 0, 1, 1, 0, 0, 1, 1, 1, 1, 1) | S6 | S8 | S2 | S9 | S6 | S8 | S2 | S3 | | | | | |
| | (1, 1, 0, 0, 0, 1, 1, 0, 0, 1, 1, 1, 1) | S6 | S7 | S1 | S2 | S9 | S6 | S8 | S2 | | | | | |
| $S4_{k-5} \to S0_k$ | (1, 1, 1, 1, 1, 0, 0, 1, 1, 0, 0, 0, 0) | S4 | S4 | S5 | S6 | S8 | S2 | S9 | S6 | | | | | |
| | (1, 1, 1, 1, 0, 0, 1, 1, 0, 0, 0, 0, 0) | S4 | S5 | S6 | S8 | S2 | S9 | S6 | S7 | | | | | |
| $S4_{k-5} \to S1_k$ | (1, 1, 1, 1, 1, 0, 0, 1, 1, 0, 0, 0, 1) | S4 | S4 | S5 | S6 | S8 | S2 | S9 | S6 | | | | | |
| | (1, 1, 1, 1, 0, 0, 1, 1, 0, 0, 0, 0, 1) | S4 | S5 | S6 | S8 | S2 | S9 | S6 | S7 | | | | | |
| $S4_{k-5} \to S2_k$ | (1, 1, 1, 1, 1, 0, 0, 1, 1, 0, 0, 1, 1) | S4 | S4 | S5 | S6 | S8 | S2 | S9 | S6 | | | | | |
| | (1, 1, 1, 1, 0, 0, 1, 1, 0, 0, 0, 1, 1) | S4 | S5 | S6 | S8 | S2 | S9 | S6 | S7 | | | | | |

| state transition | k − 1 | k | PR equalization ideal value | | | | | | | | Euclidean distance between paths |
|---|---|---|---|---|---|---|---|---|---|---|---|
| $S0_{k-9} \to S6_k$ | S5 | S6 | 1 | 3 | 4 | 4 | 4 | 4 | 5 | 6 | 5 | |
| | S9 | S6 | 0 | 1 | 3 | 4 | 4 | 4 | 4 | 4 | 4 | 12 |
| $S0_{k-9} \to S5_k$ | S4 | S5 | 1 | 3 | 4 | 4 | 4 | 5 | 7 | 7 | | |
| | S3 | S5 | 0 | 1 | 3 | 4 | 4 | 4 | 5 | 6 | | 12 |
| $S0_{k-9} \to S4_k$ | S4 | S4 | 1 | 3 | 4 | 4 | 4 | 5 | 7 | 8 | | |
| | S3 | S4 | 0 | 1 | 3 | 4 | 4 | 4 | 5 | 7 | | 12 |
| $S2_{k-7} \to S0_k$ | S7 | S0 | 5 | 6 | 5 | 4 | 4 | 4 | 4 | 3 | 1 | |
| | S0 | S0 | 4 | 4 | 4 | 4 | 4 | 4 | 3 | 1 | 0 | 12 |
| $S2_{k-7} \to S1_k$ | S7 | S1 | 5 | 6 | 5 | 4 | 4 | 4 | 4 | 3 | 2 | |
| | S0 | S1 | 4 | 4 | 4 | 4 | 4 | 4 | 3 | 1 | 1 | 12 |
| $S2_{k-7} \to S2_k$ | S8 | S2 | 5 | 6 | 5 | 4 | 4 | 4 | 4 | 4 | 4 | |
| | S1 | S2 | 4 | 4 | 4 | 4 | 4 | 4 | 3 | 2 | 3 | 12 |
| $S3_{k-5} \to S0_k$ | S7 | S0 | 7 | 7 | 5 | 4 | 4 | 4 | 4 | 3 | 1 | |
| | S0 | S0 | 6 | 5 | 4 | 4 | 4 | 4 | 3 | 1 | 0 | 12 |
| $S3_{k-5} \to S1_k$ | S7 | S1 | 7 | 7 | 5 | 4 | 4 | 4 | 4 | 3 | 2 | |
| | S0 | S1 | 6 | 5 | 4 | 4 | 4 | 4 | 3 | 1 | 1 | 12 |
| $S3_{k-5} \to S2_k$ | S8 | S2 | 7 | 7 | 5 | 4 | 4 | 4 | 4 | 4 | 4 | |
| | S1 | S2 | 6 | 5 | 4 | 4 | 4 | 4 | 3 | 2 | 3 | 12 |
| $S3_{k-5} \to S2_k$ | S5 | S6 | 2 | 3 | 4 | 4 | 4 | 5 | 6 | 5 | | |
| | S9 | S6 | 1 | 1 | 3 | 4 | 4 | 4 | 4 | 4 | | 12 |
| $S3_{k-5} \to S2_k$ | S4 | S5 | 2 | 3 | 4 | 4 | 4 | 5 | 7 | 7 | | |
| | S3 | S5 | 1 | 1 | 3 | 4 | 4 | 4 | 5 | 6 | | 12 |
| $S3_{k-5} \to S2_k$ | S4 | S4 | 2 | 3 | 4 | 4 | 4 | 5 | 7 | 8 | | |
| | S3 | S4 | 1 | 1 | 3 | 4 | 4 | 4 | 5 | 7 | | 12 |
| $S6_{k-5} \to S6_k$ | S5 | S6 | 4 | 4 | 4 | 4 | 4 | 5 | 6 | 5 | | |
| | S9 | S6 | 3 | 2 | 3 | 4 | 4 | 4 | 4 | 4 | | 12 |
| $S6_{k-5} \to S5_k$ | S4 | S5 | 4 | 4 | 4 | 4 | 4 | 5 | 7 | 7 | | |
| | S3 | S5 | 3 | 2 | 3 | 4 | 4 | 4 | 5 | 6 | | 12 |
| $S6_{k-5} \to S4_k$ | S4 | S4 | 4 | 4 | 4 | 4 | 4 | 5 | 7 | 8 | | |
| | S3 | S4 | 3 | 2 | 3 | 4 | 4 | 4 | 5 | 7 | | 12 |
| $S4_{k-5} \to S0_k$ | S7 | S0 | 8 | 7 | 5 | 4 | 4 | 4 | 4 | 3 | 1 | |
| | S0 | S0 | 7 | 5 | 4 | 4 | 4 | 4 | 3 | 1 | 0 | 12 |
| $S4_{k-5} \to S1_k$ | S7 | S1 | 8 | 7 | 5 | 4 | 4 | 4 | 4 | 3 | 2 | |
| | S0 | S1 | 7 | 5 | 4 | 4 | 4 | 4 | 3 | 1 | 1 | 12 |
| $S4_{k-5} \to S2_k$ | S8 | S2 | 8 | 7 | 5 | 4 | 4 | 4 | 4 | 4 | 4 | |
| | S1 | S2 | 7 | 5 | 4 | 4 | 4 | 4 | 3 | 2 | 3 | 12 |

Each of these Tables 1 to 3 shows the paths of two state transition patterns from their start state through their merging state by recording codes ($b_{k-i}$, ..., $b_k$), two recording sequences that could have gone through those two state transitions by (k-9, ..., k), two ideal read signal waveforms (PR equalization ideal values) that could have gone through those two state transitions, and a Euclidean distance between those two ideal read signal waveforms (i.e., a Euclidean distance between the two paths).

Specifically, Table 1 shows 18 different pairs of state transition patterns, each of which can take two different paths and has a Euclidean distance of 14 between themselves. These patterns correspond to the boundaries between marks and spaces on an optical disk medium (i.e., edge portions of a waveform). In other words, these patterns represent one-bit shift errors at those edges. For example, a state transition path leading from S0 (k-5) to S6 (k) according to the state transition rules shown in FIG. 3 will be described. In that case, one path with a recording sequence "0, 0, 0, 0, 1, 1, 1, 0, 0" is detected. If zeros of the read data are replaced with spaces and ones are replaced with marks, this recording sequence corresponds to a combination of a space with a length of 4T or more, a 3T mark, and a space with a length of 2T or more. The PR equalization ideal waveform of that path is shown as Path A waveform in FIG. 4.

Figure 4:
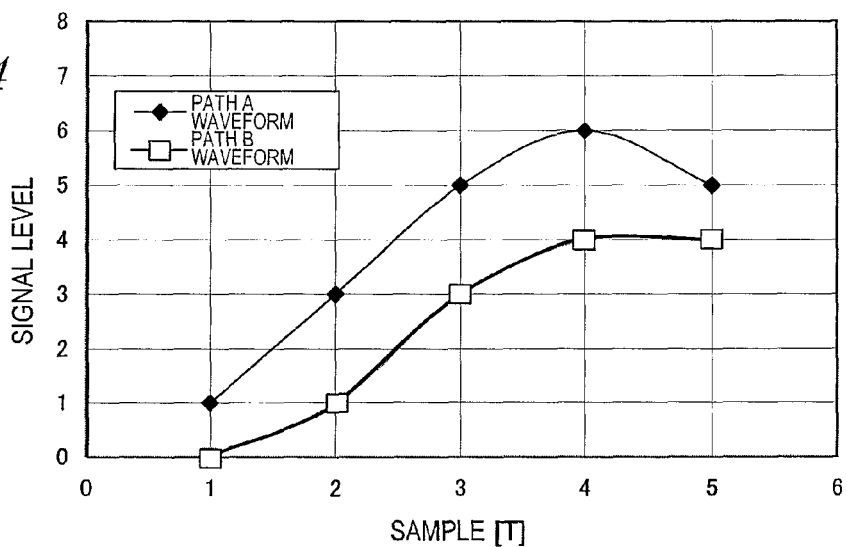
FIG. 4 shows an exemplary PR equalization ideal waveform for the state transition patterns shown in Table 1 in a preferred embodiment of the present invention.
Figure 5:
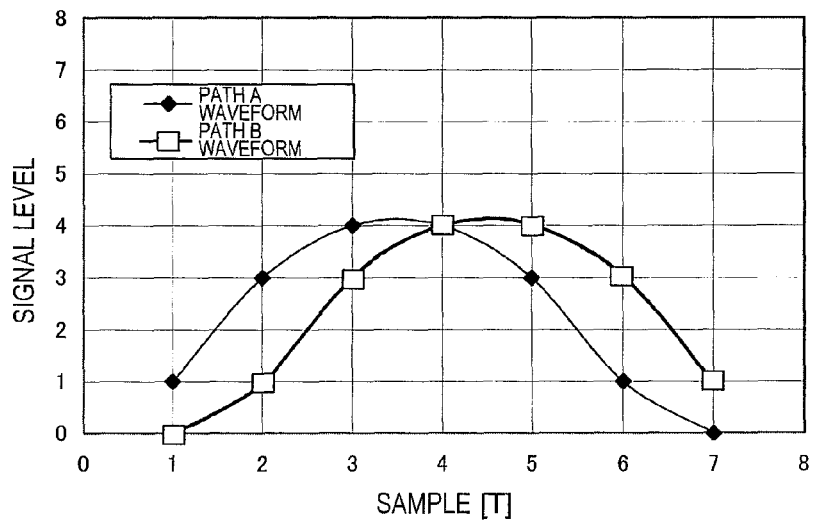
FIG. 5 shows an exemplary PR equalization ideal waveform for the state transition patterns shown in Table 2 in a preferred embodiment of the present invention.
Figure 6:
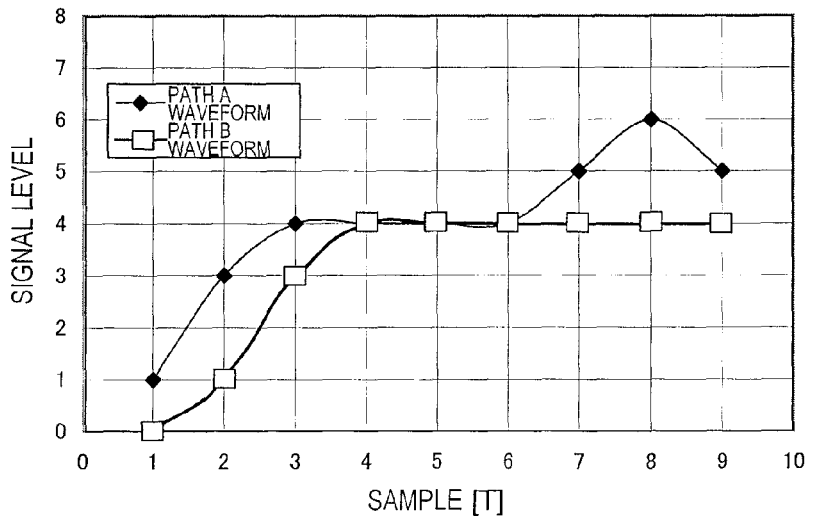
FIG. 6 shows an exemplary PR equalization ideal waveform for the state transition patterns shown in Table 3 in a preferred embodiment of the present invention.

FIG. 4 shows examples of the PR equalization ideal waveforms shown in Table 1. FIG. 5 shows examples of the PR equalization ideal waveforms shown in Table 2. And FIG. 6 shows examples of the PR equalization ideal waveforms shown in Table 3. In FIGS. 4, 5 and 6, the abscissa represents the sampling time (in this case, sampling is supposed to be carried out every point in time of the recording sequence) and the ordinate represents the read signal level.

As described above, PR 12221 ML has nine ideal read signal levels from Level 0 through Level 8. The other one of the two state transition paths leading from S0 (k-5) to S6 (k) according to the state transition rules shown in FIG. 3 has a recording sequence "0, 0, 0, 0, 0, 1, 1, 0, 0". If zeros of the read data are replaced with spaces and ones are replaced with marks, this recording sequence corresponds to a combination of a space with a length of 5T or more, a 2T mark, and a space with a length of 2T or more. The PR equalization ideal waveform of that path is shown as Path B waveform in FIG. 4.

The patterns with a Euclidean distance of 14 shown in Table 1 are characterized by always including a single piece of edge information. By taking advantage of this feature, the best edge adjustment can be done for the PRML method.

Table 2 shows 18 different pairs of state transition patterns, each of which has a Euclidean distance of 12 between themselves. These patterns correspond to shift errors of a 2T mark or a 2T space and represent two-bit error patterns. For example, a state transition path leading from S0 (k-7) to S0 (k) according to the state transition rules shown in FIG. 3 will be described. In that case, one path with a recording sequence "0, 0, 0, 0, 1, 1, 0, 0, 0, 0" is detected. If zeros of the read data are replaced with spaces and ones are replaced with marks, this recording sequence corresponds to a combination of a space with a length of 4T or more, a 2T mark, and a space with a length of 5T or more. The PR equalization ideal waveform of that path is shown as Path A waveform in FIG. 5.

The other one of the two state transition paths has a recording sequence "0, 0, 0, 0, 0, 1, 1, 0, 0, 0". If zeros of the read data are replaced with spaces and ones are replaced with marks, this recording sequence corresponds to a combination of a space with a length of 5T or more, a 2T mark, and a space with a length of 4T or more. The PR equalization ideal waveform of that path is shown as Path B waveform in FIG. 5.

The patterns with a Euclidean distance of 12 shown in Table 2 are characterized by always including two pieces of leading and trailing edge information with a length of 2T.

Table 3 shows 18 different pairs of state transition patterns, each of which has a Euclidean distance of 12 between themselves. These patterns correspond to portions where 2T marks and 2T spaces appear consecutively and represent three-bit error patterns. For example, a state transition path leading from S0 (k-9) to S6 (k) according to the state transition rules shown in FIG. 3 will be described. In that case, one path with a recording sequence "0, 0, 0, 0, 1, 1, 0, 0, 1, 1, 1, 0, 0" is detected. If zeros of the read data are replaced with spaces and ones are replaced with marks, this recording sequence corresponds to a combination of a space with a length of 4T or more, a 2T mark, a 2T space, a 3T mark, and a space with a length of 2T or more. The PR equalization ideal waveform of that path is shown as Path A waveform in FIG. 6.

The other one of the two state transition paths has a recording sequence "0, 0, 0, 0, 0, 1, 1, 0, 0, 1, 1, 0, 0". If zeros of the read data are replaced with spaces and ones are replaced with marks, this recording sequence corresponds to a combination of a space with a length of 5T or more, a 2T mark, a 2T space, a 2T mark and a space with a length of 2T or more. The PR equalization ideal waveform of that path is shown as Path B waveform in FIG. 6.

The patterns with a Euclidean distance of 12 shown in Table 3 are characterized by always including at least three pieces of edge information.

To adjust the position of the leading or trailing edge of a recording mark, the magnitude and direction of edge shift need to be detected for every mark and space combination. That is why if the PR 12221 ML method is adopted, the state transition patterns with a Euclidean distance of 14 shown in Table 1 may be used.

The best position of the leading or trailing edge of a recording mark changes according to the characteristics of the PRML method adopted. As far as the PR 12221 ML is concerned, the leading edge portion of a 2T mark that follows a space with a length of 5 T or more has an ideal waveform such as Path B waveform shown in FIG. 4, in which read signal level 4 is the center of all nine levels. This means that the signal amplitude of a 2T mark ideally becomes equal to zero. That is to say, if the leading edge of a 2T mark is adjusted so that the 2T mark has such signal amplitude, the recording mark will shrink.

To compare the characteristics of multiple PRML methods, PRML 1221 ML will be described as another exemplary PRML method. Unlike PR 12221 ML, PR 1221 ML has a non-treble-boosted property. By combining PR 1221 ML and RLL (1, 7) with each other, the number of states in the decoding section is limited to six, the number of state transition paths thereof becomes ten, and the number of read signal levels becomes seven.

Figure 7:
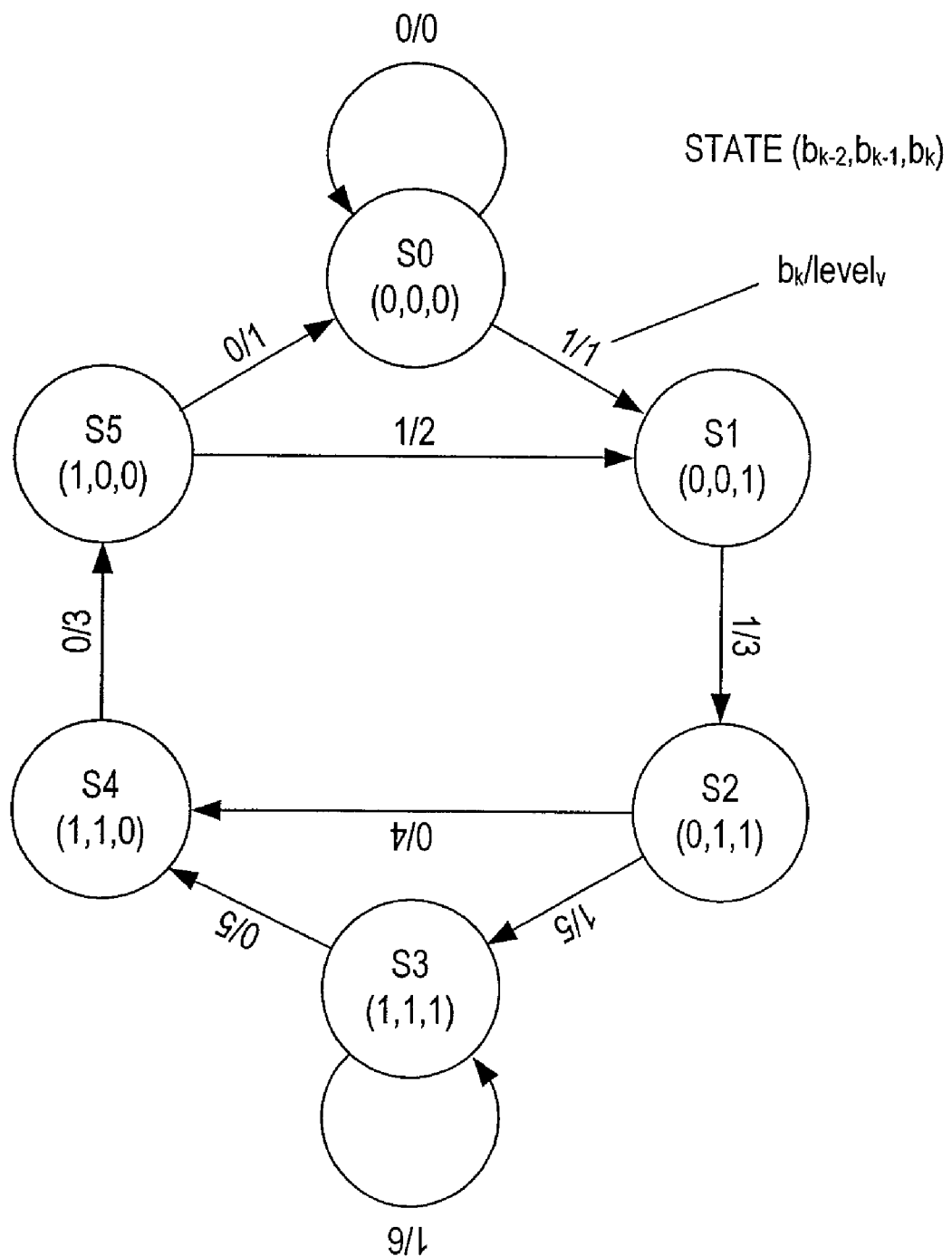
FIG. 7 shows state transition rules defined by a combination of RLL (1, 7) recording code and PR (1, 2, 2, 1) equalization in a preferred embodiment of the present invention.
Figure 8:
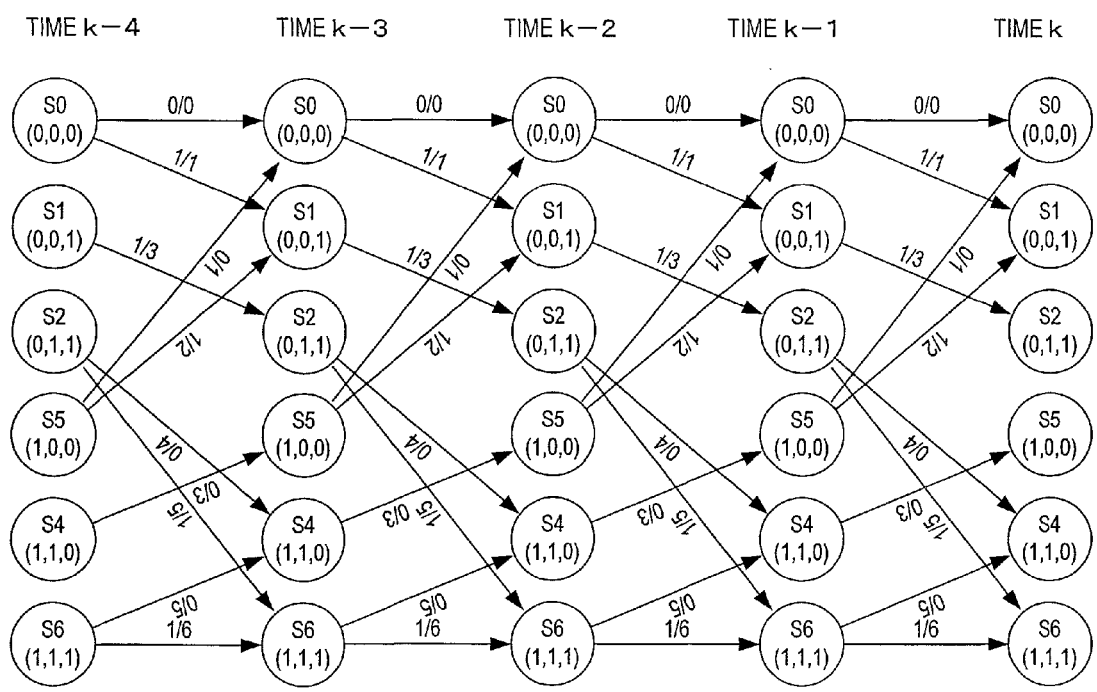
FIG. 8 is a trellis diagram corresponding to the state transition rules shown in FIG. 7.

FIG. 7 is a state transition diagram showing state transition rules to be determined by the combination of RLL (1, 7) and PR 1221 ML. FIG. 8 is a trellis diagram representing the state transition rules shown in FIG. 7.

As shown in FIG. 7, six states are represented by identifying, at a certain point in time, a state S (0, 0, 0) by S0, a state S (0, 0, 1) by S1, a state S (0, 1, 1) by S2, a state S (1, 1, 1) by S3, a state S (1, 1, 0) by S4, and a state S (1, 0, 0) by S5, respectively, where zero or one in the parentheses represents a signal sequence on the time axis and shows what state could be produced as a result of the next state transition from the current state. Also, if this state transition diagram is extended along the time axis, the trellis diagram shown in FIG. 8 can be obtained.

In the state transitions of PR 1221 ML shown in FIG. 8, there are an infinite number of state transition patterns (i.e., combinations of states) that can take two state transition paths in making a transition from a particular state at a certain point in time into another particular state at the next point in time. If we pay attention to only patterns that are particularly likely to produce errors in a certain time range, the state transition patterns of PR 1221 ML may be summarized as patterns with a Euclidean distance of 10 as shown in the following Table 4:

TABLE 4

| state transition | recording code $(b_{k-i}, \ldots, b_k)$ | K−10 | K−9 | K−8 | K−7 | K−6 | K−5 | K−4 | K−3 | K−2 |
|---|---|---|---|---|---|---|---|---|---|---|
| S2(K−4)→S0(K) | (0, 1, 1, 0, 0, 0, 0) | | | | | | | S2 | S4 | S5 |
| | (0, 1, 1, 1, 0, 0, 0) | | | | | | | S2 | S3 | S4 |
| S3(K−4)→S0(K) | (1, 1, 1, 0, 0, 0, 0) | | | | | | | S3 | S4 | S5 |
| | (1, 1, 1, 1, 0, 0, 0) | | | | | | | S3 | S3 | S4 |
| S2(K−4)→S1(K) | (0, 1, 1, 0, 0, 0, 1) | | | | | | | S2 | S4 | S5 |
| | (0, 1, 1, 1, 0, 0, 1) | | | | | | | S2 | S3 | S4 |
| S3(K−4)→S1(K) | (1, 1, 1, 0, 0, 0, 1) | | | | | | | S3 | S4 | S5 |
| | (1, 1, 1, 1, 0, 0, 1) | | | | | | | S3 | S3 | S4 |
| S0(K−4)→S4(K) | (0, 0, 0, 0, 1, 1, 0) | | | | | | | S0 | S0 | S1 |
| | (0, 0, 0, 1, 1, 1, 0) | | | | | | | S0 | S1 | S2 |
| S5(K−4)→S4(K) | (1, 0, 0, 0, 1, 1, 0) | | | | | | | S5 | S0 | S1 |
| | (1, 0, 0, 1, 1, 1, 0) | | | | | | | S5 | S1 | S2 |
| S0(K−4)→S3(K) | (0, 0, 0, 0, 1, 1, 1) | | | | | | | S0 | S0 | S1 |
| | (0, 0, 0, 1, 1, 1, 1) | | | | | | | S0 | S1 | S2 |
| S5(K−4)→S3(K) | (1, 0, 0, 0, 1, 1, 1) | | | | | | | S5 | S0 | S1 |
| | (1, 0, 0, 1, 1, 1, 1) | | | | | | | S5 | S1 | S2 |

| state transition | K−1 | K | PR equalization ideal value | | | | Euclidean distance between paths |
|---|---|---|---|---|---|---|---|
| S2(K−4)→S0(K) | S0 | S0 | 4 | 3 | 1 | 0 | |
| | S5 | S0 | 5 | 5 | 3 | 1 | 10 |
| S3(K−4)→S0(K) | S0 | S0 | 5 | 3 | 1 | 0 | |
| | S5 | S0 | 6 | 5 | 3 | 1 | 10 |
| S2(K−4)→S1(K) | S0 | S1 | 4 | 3 | 1 | 1 | |
| | S5 | S1 | 5 | 5 | 3 | 2 | 10 |
| S3(K−4)→S1(K) | S0 | S1 | 5 | 3 | 1 | 1 | |
| | S5 | S1 | 6 | 5 | 3 | 2 | 10 |
| S0(K−4)→S4(K) | S2 | S4 | 0 | 1 | 3 | 4 | |
| | S3 | S4 | 1 | 3 | 5 | 5 | 10 |
| S5(K−4)→S4(K) | S2 | S4 | 1 | 1 | 3 | 4 | |
| | S3 | S4 | 2 | 3 | 5 | 5 | 10 |
| S0(K−4)→S3(K) | S2 | S3 | 0 | 1 | 3 | 5 | |
| | S3 | S3 | 1 | 3 | 5 | 6 | 10 |
| S5(K−4)→S3(K) | S2 | S5 | 1 | 1 | 3 | 5 | |
| | S3 | S5 | 2 | 3 | 5 | 6 | 10 |

Table 4 shows the paths of two state transition patterns from their start state through their merging state by recording codes $(b_{k-i}, \ldots, b_k)$, two recording sequences that could have gone through those two state transitions by (K-10, . . . , K), two ideal read signal waveforms (PR equalization ideal values) that could have gone through those two state transitions, and a Euclidean distance between those two ideal read signal waveforms (i.e., a Euclidean distance between the two paths).

According to the PR 1221 ML method, patterns that always include a single piece of edge information are the patterns with a Euclidean distance of 10 shown in Table 4. Also, according to the PR 1221 ML method, the ideal waveform of the leading edge portion of a 2T mark that follows a space with a length of 5T or more will be the Path B waveform shown in FIG. 9, which is one of two waveforms that could have made a transition from the state S0 (K-4) to the state S4 (K).

Figure 9:
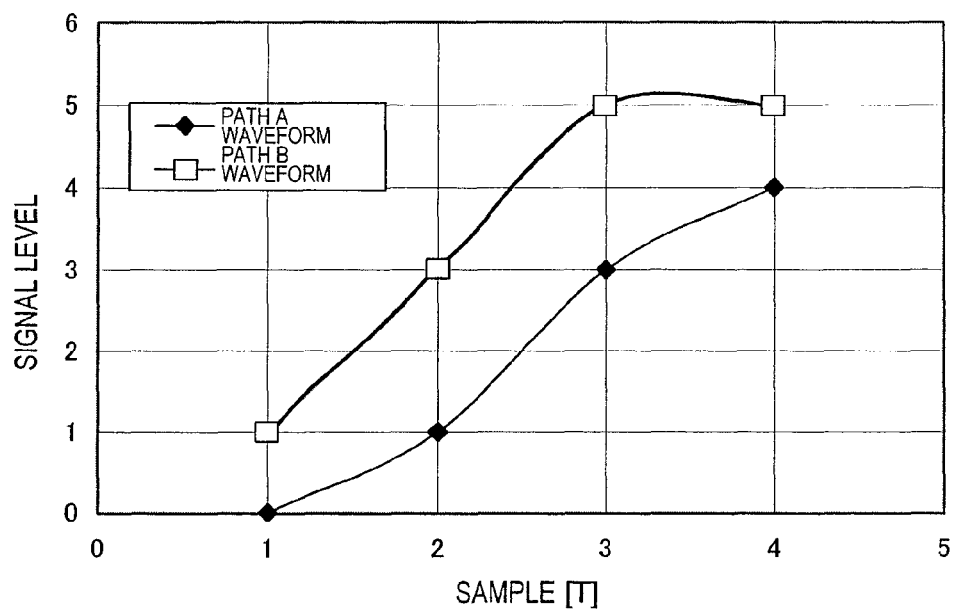
FIG. 9 shows an exemplary PR equalization ideal waveform for the state transition patterns shown in Table 4 in a preferred embodiment of the present invention.

FIG. 9 shows examples of the PR equalization ideal waveforms shown in Table 4. Since the PR 1221 ML has an ideal read signal level of seven, the center of the read signal levels shown in FIG. 7 is Level 3. As the signal amplitude of a 2T mark of the PR 1221 ML shown in FIG. 7 has Level 4, the leading edge of the 2T mark can be adjusted such that the signal amplitude of the 2T mark becomes greater than in the PR 12221 ML. Not just the leading edge of the 2T mark but also the trailing edge of the 2T mark and the leading and trailing edges of a mark with a length of 3T or more may be adjusted in a similar manner. Attention should be paid to the fact that an adjusted recording mark will have a different shape according to the characteristic of the PRML method as described above.

Hereinafter, it will be described what calculations need to be done to evaluate a read signal and to detect edge shifting. A signal evaluation index M for evaluating a read signal can be calculated by the following Equations (1), (2) and (3):

$$D = |Pa - Pb| - d^2 \quad (1)$$

$$\sigma^2 = \overline{D^2} - \overline{D}^2 \quad (2)$$

$$M = \frac{\sigma}{2 \cdot d^2} \quad (3)$$

This is an index that is similar to jitter and correlated to the read performance of PRML. As this index is described in Patent Document No. 1, a detailed description thereof will be omitted herein. The entire disclosure of Patent Document No. 1 (Japanese Patent Application Laid-Open Publication No. 2003-141823) is hereby incorporated by reference.

The following Table 5 shows specifically how calculations given by Equation (1) are made according to the PR 1221 ML method:

TABLE 5

Pa-Pb according to PR 1221 ML where $d^2 = 10$

| State transition | $b_k b_{k-1} b_{k-2} b_{k-3} b_{k-4} b_{k-5} b_{k-6}$ | Pa-Pb |
|---|---|---|
| $S0_{k-4} \to S4_k$ | 000x110 | $(y_{k-3} - T_{-3})^2 + (y_{k-2} - T_{-2})^2 + (y_{k-1} - T_0)^2 + (y_k - T_1)^2 - \{(y_{k-3} - T_{-2})^2 + (y_{k-2} - T_0)^2 + (y_{k-1} - T_2)^2 + (y_k - T_2)^2\}$ |
| $S0_{k-4} \to S3_k$ | 000x111 | $(y_{k-3} - T_{-3})^2 + (y_{k-2} - T_{-2})^2 + (y_{k-1} - T_0)^2 + (y_k - T_2)^2 - \{(y_{k-3} - T_{-2})^2 + (y_{k-2} - T_0)^2 + (y_{k-1} - T_2)^2 + (y_k - T_3)^2\}$ |
| $S2_{k-4} \to S0_k$ | 011x000 | $(y_{k-3} - T_1)^2 + (y_{k-2} - T_0)^2 + (y_{k-1} - T_{-2})^2 + (y_k - T_{-3})^2 - \{(y_{k-3} - T_2)^2 + (y_{k-2} - T_2)^2 + (y_{k-1} - T_0)^2 + (y_k - T_{-2})^2\}$ |
| $S2_{k-4} \to S1_k$ | 011x001 | $(y_{k-3} - T_1)^2 + (y_{k-2} - T_0)^2 + (y_{k-1} - T_{-2})^2 + (y_k - T_{-2})^2 - \{(y_{k-3} - T_2)^2 + (y_{k-2} - T_2)^2 + (y_{k-1} - T_0)^2 + (y_k - T_{-1})^2\}$ |
| $S5_{k-4} \to S4_k$ | 100x110 | $(y_{k-3} - T_{-2})^2 + (y_{k-2} - T_{-2})^2 + (y_{k-1} - T_0)^2 + (y_k - T_1)^2 - \{(y_{k-3} - T_{-1})^2 + (y_{k-2} - T_0)^2 + (y_{k-1} - T_2)^2 + (y_k - T_2)^2\}$ |
| $S5_{k-4} \to S3_k$ | 100x111 | $(y_{k-3} - T_{-2})^2 + (y_{k-2} - T_{-2})^2 + (y_{k-1} - T_0)^2 + (y_k - T_2)^2 - \{(y_{k-3} - T_{-1})^2 + (y_{k-2} - T_0)^2 + (y_{k-1} - T_2)^2 + (y_k - T_3)^2\}$ |
| $S3_{k-4} \to S0_k$ | 111x000 | $(y_{k-3} - T_2)^2 + (y_{k-2} - T_0)^2 + (y_{k-1} - T_{-2})^2 + (y_k - T_{-3})^2 - \{(y_{k-3} - T_3)^2 + (y_{k-2} - T_2)^2 + (y_{k-1} - T_0)^2 + (y_k - T_{-2})^2\}$ |
| $S3_{k-4} \to S1_k$ | 111x001 | $(y_{k-3} - T_2)^2 + (y_{k-2} - T_0)^2 + (y_{k-1} - T_{-2})^2 + (y_k - T_{-2})^2 - \{(y_{k-3} - T_3)^2 + (y_{k-2} - T_2)^2 + (y_{k-1} - T_0)^2 + (y_k - T_{-1})^2\}$ |

In Table 5, $y_{k-3}$ through $y_k$ are PR equalization waveform (maximum likelihood decoding section input waveform) sequences to be described later, $T_{-3}$ through $T_3$ are PR equalization ideal value sequences (which can be in the range of 0 to 6) shown in Table 4, and the Euclidean distance is 10 ($d^2=10$).

The patterns shown in Tables 4 and 5 correspond to the leading and trailing edge portions. That is why if the calculations given by Equation (1) are made with the read digital signals classified for every possible combination of mark and space lengths, then the magnitude and direction of edge shifting can be calculated for every possible combination. Likewise, by applying the same idea to the calculations to be done according to the PR 12221 ML shown in Table 1, the magnitude and direction of edge shifting can be calculated for every possible combination of mark and space lengths.

Embodiment 1

Hereinafter, a preferred embodiment of an optical disk drive according to the present invention will be described with reference to FIG. 1, which illustrates an optical disk drive 100 as a first specific preferred embodiment of the present invention.

The information recording medium 1 shown in FIG. 1 is used to read and write information optically from/on it and may be an optical disk medium, for example. The optical disk drive 100 is a read/write system for reading and writing information from/on the given information recording medium 1.

The optical disk drive 100 includes a read section 101, a write condition modifying section 102 and a write section 103.

The read section 101 includes an optical head 2, a preamplifier 3, an automatic gain controller (AGC) 4, a waveform equalizer 5, an A/D converter 6 and a PLL 7. The read section 101 generates a digital signal based on an analog signal representing information that has been read from the information recording medium.

The write condition modifying section 102 includes a PRML section 104, a signal evaluation index calculator 10, and a modifying section 105. The PRML section 104 includes a variable PR equalizer 8 and a variable maximum likelihood decoder 9. The modifying section 105 includes an edge shifting detector 11 and an optical disk controller 12. The write condition modifying section 102 may be implemented as a semiconductor chip, for example.

The write section 103 includes a pattern generator 13, a write compensator 14 and a laser driver 15.

The optical head 2 converges a laser beam 2a, which has been transmitted through an objective lens 2b, on the recording layer of the information recording medium 1 and receives the light reflected from the medium 1, thereby generating an analog read signal representing information that is stored on the information recording medium 1. The objective lens 2b preferably has a numerical aperture of 0.7 to 0.9, more preferably 0.85. The laser beam 2a preferably has a wavelength of 410 nm or less, more preferably 405 nm.

The preamplifier 3 amplifies the analog read signal with a predetermined gain and outputs the amplified signal to the AGC 4. In response, the AGC 4 further amplifies the read signal with a preset target gain such that the read signal will have a constant level when output from the A/D converter and then passes the amplified signal to the waveform equalizer 5.

The waveform equalizer 5 functions as a filter for amplifying the high frequency portion of the read signal, and outputs such a read signal with an amplified high frequency portion to the A/D converter 6.

The PLL 7 generates a read clock signal, which is synchronized with the waveform-equalized read signal, and outputs it to the A/D converter 6.

In response to the read clock signal supplied from the PLL 7, the A/D converter 6 samples the read signal, converts the analog read signal into a digital read signal and outputs it to the variable PR equalizer 8, the PLL 7 and the AGC 4.

The variable PR equalizer 8 has the ability to change its filter characteristics into any one of multiple PR characteristics. The variable PR equalizer 8 has such a frequency characteristic that was defined such that the read/write system has a frequency characteristic expected by the variable maximum likelihood decoder 9 (such as PR (1, 2, 2, 1) equalization characteristic or PR (1, 2, 2, 2, 1) equalization characteristic). Specifically, the variable PR equalizer 8 carries out PR equalization processing on the read signal by reducing the radio frequency noise thereof and by intentionally producing intersymbol interference, and then outputs the processed read signal to the variable maximum likelihood decoder 9.

A method for changing the characteristics of the variable PR equalizer 8 will be described. In a situation where PR (a, b, b, a) equalization characteristic is adopted, b/a=A is supposed to be satisfied and A1 and A2 (that is smaller than A1)

are supposed to be used as A. In this manner, classes can be changed from a treble-boosted one using A1 into a non-treble-boosted one using A2.

According to another method, the characteristics are changed from a PR equalization characteristic that emphasizes 2T into a different PR equalization characteristic that does not emphasize 2T. Specifically, the variable PR equalizer 8 changes the PR (a, b, b, a) equalization characteristic into a PR (x, y, z, y, x) equalization characteristic. At the same time, b/a=A and ((y+z)/2)/((x−y)/2)=B are supposed to be satisfied and the classes are changed from a treble-boosted one into a non-treble-boosted one using coefficients x, y and z that satisfy A>B. For example, by changing the characteristics from PR (1, 2, 2, 1) equalization into PR (1, 2, 2, 2, 1) equalization and increasing the order of the filter, the characteristics can be changed into a PR equalization characteristic that does not emphasize 2T.

The variable maximum likelihood decoder 9 can change the types of maximum likelihood decoding processing when the PR characteristics of the variable PR equalizer 8 are changed. For example, when A1 is changed into A2 according to the former method, the threshold values for use in decoding processing are changed into the best value for A2. According to the latter method, on the other hand, the threshold values for use in the decoding processing and the decoding rules are changed into best ones.

The variable maximum likelihood decoder 9 may be a Viterbi decoder, for example, and uses a maximum likelihood decoding technique, which estimates the most likely sequence by the coding rule that has been added intentionally according to the type of the partial response, to decode the read signal that has been subjected to the PR equalization by the variable PR equalizer 8 and output binarized data. This binarized data is output as demodulated binarized signal to a circuit on the next stage (not shown) and then subjected to a predetermined type of processing, thereby reading the information that is stored on the information recording medium 1.

The signal evaluation index calculator 10 receives the waveform-shaped digital read signal from the variable PR equalizer 8 and the binarized signal from the variable maximum likelihood decoder 9. Specifically, the signal evaluation index calculator 10 determines the state transition by the binarized signal and carries out calculations represented by Equation (1) and showing the reliability of the decoding result based on the decision result and the branch metric. The signal evaluation index of the present invention shows the degree of reliability of the decoding result. Furthermore, the signal evaluation index calculator 10 classifies the results of calculations according to the binarized signal for every possible combination of mark and space lengths. For example, the signal evaluation index calculator 10 generates a pulse signal for each of the eighteen patterns shown in Table 1 or each of the eight patterns shown in Table 4 (i.e., for every pattern at the leading or trailing edge of a recording mark) and outputs it to the edge shifting detector 11.

The edge shifting detector 11 adds together those results of calculations on a pattern-by-pattern basis to find how much a parameter, which is used to adjust the edge position of a recording mark, has shifted from its best value (which will be referred to herein as "edge shifting").

The optical disk controller 12 changes write parameters (e.g., waveforms of write signals) that have been determined necessary according to the magnitude of pattern-by-pattern edge shifting. Also, the optical disk controller 12 outputs a control signal to change the PRML characteristics to the variable PR equalizer 8, the variable maximum likelihood decoder 9 and the signal evaluation index calculator 10. When the PRML characteristics are changed, the variable PR equalizer 8, the variable maximum likelihood decoder 9 and the signal evaluation index calculator 10 may perform different types of processing or calculations. That is why the parameters of the variable PR equalizer 8, the variable maximum likelihood decoder 9 and the signal evaluation index calculator 10 are changed synchronously with each other by the optical disk controller 12.

The pattern generator 13 generates and outputs a write pattern to adjust the edges of a recording mark. The write compensator 14 generates a laser radiation waveform pattern based on the write parameters supplied from the optical disk controller 12 and the write pattern. And the laser driver 15 controls the laser emission operation of the optical head 2 following the laser radiation waveform pattern generated.

Hereinafter, it will be described in further detail how this optical disk drive 100 operates. To adjust the write parameters, the optical disk controller 12 instructs the write compensator 14 to perform test write operations using initial values of the write parameters that are stored as control data on the optical disk medium and then using values that are several steps away from those initial values. The optical disk controller 12 outputs a few patterns of write parameters to the write compensator 14. Meanwhile, the pattern generator 13 outputs a write pattern to adjust the edges of a recording mark. In response, the write compensator 14 generates a laser radiation waveform pattern based on the write parameters supplied from the optical disk controller 12 and the write pattern. And the laser driver 15 controls the laser emission operation of the optical head 2 following the laser radiation waveform pattern generated. By performing this series of processing steps, a test write operation can be done to adjust the edges of a recording mark. Next, data is read from the area on which the test write operation has been performed.

The optical disk controller 12 instructs the variable PR equalizer 8, the variable maximum likelihood decoder 9 and the signal evaluation index calculator 10 to follow the PR 1221 ML characteristic. In response, the variable PR equalizer 8 shapes the waveform such that the output waveform will have the PR 1221 characteristic. The variable maximum likelihood decoder 9 changes the threshold values for use to make branch metric calculations into one for the PR 1221 ML, and also limits the number of states to six and the number of transition paths of the branch metric to ten.

To figure out the read signal evaluation index M for the PR 1221 ML, the signal evaluation index calculator 10 makes the calculations represented by Equations (1) to (3) following the state transition paths shown in Table 4, and outputs results of the calculations to the edge shifting detector 11. In response, the edge shifting detector 11 adds together the magnitudes of edge shifts for all possible combinations of mark and space lengths and outputs the sum to the optical disk controller 12. And the optical disk controller 12 finds the best values of the parameters to adjust the edges of a recording mark based on the sum of the magnitudes of edge shifts, and outputs those best parameters to the write compensator 14. By performing this series of processing steps, the best values of parameters to adjust the edges of a recording mark can be obtained.

On the other hand, when user data or any other type of data is read, the optical disk controller 12 instructs the variable PR equalizer 8 and the variable maximum likelihood decoder 9 to follow the PR 12221 ML characteristic. In response, the variable PR equalizer 8 shapes the waveform such that the output waveform will have the PR 12221 characteristic. The variable maximum likelihood decoder 9 changes the threshold values for use to make branch metric calculations into one for the PR 12221 ML, and also limits the number of states to ten and the number of transition paths of the branch metric to sixteen. Also, the variable maximum likelihood decoder 9 decodes the read signal and outputs binarized data. This binarized data is output as demodulated binarized signal to a circuit on the next stage (not shown) and then subjected to a predetermined type of processing, thereby reading the information (such as video, audio or characters) stored on the information recording medium 1.

Also, when a read operation is performed to rate the storage quality of a storage area, the optical disk controller 12 instructs the variable PR equalizer 8, the variable maximum likelihood decoder 9 and the signal evaluation index calculator 10 to follow the PR 12221 ML characteristic. In response, the variable PR equalizer 8 shapes the waveform such that the output waveform will have the PR 12221 characteristic. The variable maximum likelihood decoder 9 changes the threshold values for use to make branch metric calculations into one for the PR 12221 ML, and also limits the number of states to ten and the number of transition paths of the branch metric to sixteen.

To figure out the read signal evaluation index M for the PR 12221 ML, the signal evaluation index calculator 10 makes the calculations represented by Equations (1) to (3) following the state transition paths shown in Tables 1 to 3, and outputs results of the calculations to the edge shifting detector 11. In response, the edge shifting detector 11 adds together the signal evaluation indices M for every transition path shown in Tables 1 to 3, and outputs the sum to the optical disk controller 12. And the optical disk controller 12 can rate the storage quality of the given storage area by the sum of the signal evaluation indices M. In this case, the edge shifting detector 11 may be used not just as a block for calculating the sum of the magnitudes of edge shifts but also as a block for calculating the sum of the signal evaluation indices M.

As described above, when the write parameters need to be adjusted (particularly when parameters concerning edge positions on the boundary between the marks and spaces need to be adjusted), the write parameters are adjusted by selecting such a PRML characteristic that would achieve the best write performance, thereby optimizing the storage quality of the medium. As a result, the system can maintain a sufficient write margin easily.

If the edge positions are adjusted by PR 12221 ML, the size of 2T marks or 3T marks may be adjusted into a smaller one. As a result, the write margin could decrease (which means a variation in recording power or a shrinkage of the tolerable strategy error range) and the PLL for generating a sync signal based on a read signal might lose its stability of operation. Also, particularly if small marks such as 2T marks or 3T marks were recorded so as to further reduce their size, the jitter as a signal evaluation index could deteriorate so significantly that it would be difficult to read such data for a device that adopts a non-PRML decision method (such as a level determination method) for its read system. Consequently, that might raise an issue in terms of optical disk medium compatibility. Thus, if the PR 1221 ML method is adopted to adjust the edges, the lengths (or positions) of the 2T marks and 3T marks can be adjusted into an appropriate mark length. As a result, the write operation can be performed with the write margin made full use of, the PLL for generating a sync signal based on the read signal can recover its stability, and the optical disk medium can maintain its compatibility constantly.

As described above, when information needs to be read by accessing the user area, the read operation may be performed by selecting such a PRML characteristic that would achieve the best read performance. In that case, the system's read margin can be maximized.

As also described above, when a read operation needs to be performed to rate the storage quality of a given storage area, the system's read performance can be recognized by calculating a signal evaluation index M for the PRML characteristic to adopt for the read operation. And by confirming the system's margin with this index M, it can be determined whether or not the optical disk drive can support the storage state or write performance of the given medium. This decision can be made based on a variation in the value of the signal evaluation index M of the area in which data has been tentatively written with the recording power varied or on the value of the signal evaluation index M of the area in which data has been written with the best write parameters.

Optionally, servo parameters such as a focus position parameter, a spherical aberration position parameter, and a tracking position parameter may be optimized using the signal evaluation index M. If the value of the index M preferably varies sensitively responsive to a variation in any of those parameters, then adjustments may be made not by the PRML characteristic that is usually adopted for reading but by a PRML characteristic that would achieve an inferior read performance. For example, according to a method in which a parameter is changed and a trough of the variation in evaluation index M is found to extract the best parameter value, the trough can be located with little parameter variation. That is why a servo failure that could be caused if the parameter were changed significantly is avoidable and the system can get stabilized.

Figure 10:
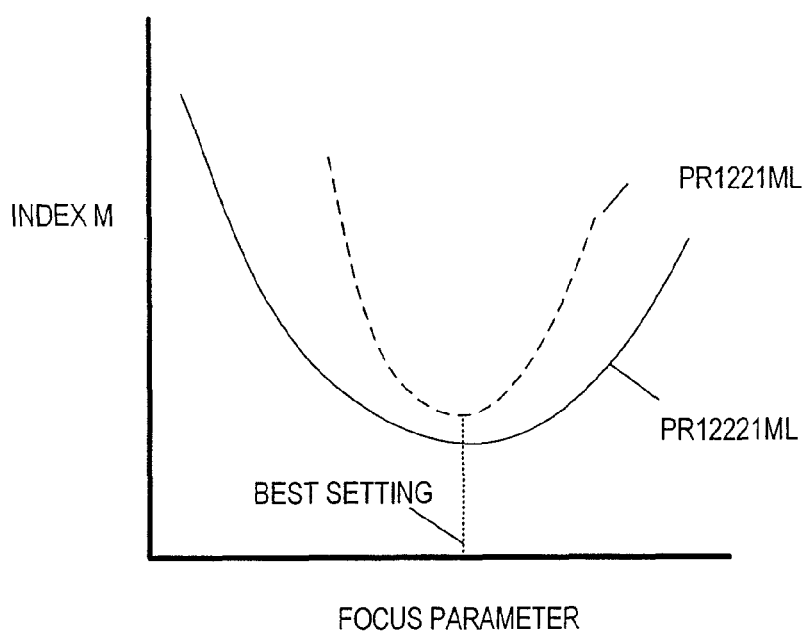
FIG. 10 shows how the index M of each PRML characteristic changes with a focus parameter during a focus position adjustment in a preferred embodiment of the present invention.

FIG. 10 shows how the index M of each PRML characteristic changes with the focus parameter. If the given read system would achieve higher read performance by the PR 12221 ML than by the PR 1221 ML, then the trough of the index M can be detected more accurately in a range with little parameter variation by adjusting the focus parameter with the index M for the PR 1221 ML.

Figure 11:
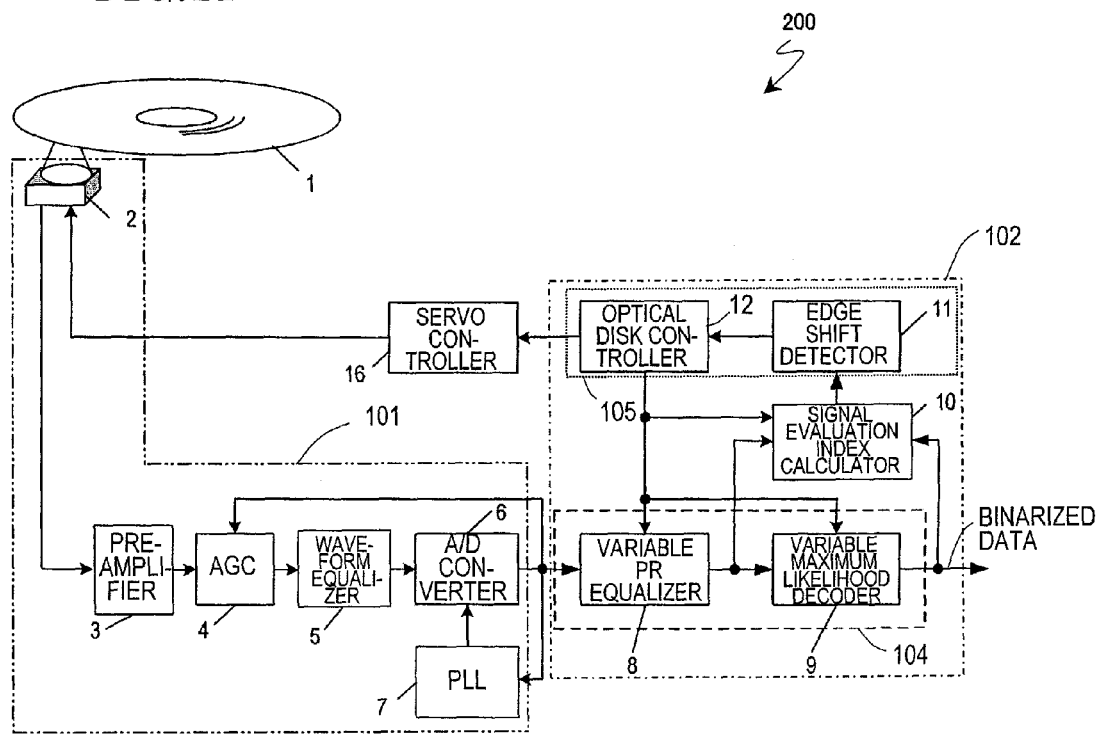
FIG. 11 illustrates an optical disk drive according to another preferred embodiment of the present invention.

An optical disk drive 200 that optimizes those servo parameters in this manner is shown in FIG. 11. The configuration of the optical disk drive 200 is substantially the same as that of the optical disk drive 100 shown in FIG. 1 but illustration of some components is omitted for the sake of simplicity. The optical disk drive 200 further includes a servo controller 16.

The servo controller 16 performs various types of controls, including optical head's position control, focus position control, spherical aberration position control, and tracking position control, in order to access a particular location on a given optical disk medium. The optical disk controller 12 outputs the best value of focus parameters (see FIG. 10) to the servo controller 16. In response, the servo controller 16 controls the focus position using that parameter. Not just the focus position parameter but also the spherical aberration position parameter and the tracking position parameter may be obtained in a similar manner and optimized. Then, the optical disk drive can perform read/write operation with much more stability. Also, the servo parameters to optimize include not just servo parameters for reading but also ones for writing.

Furthermore, the signal evaluation index needs to be calculated differently according to the PRML characteristic to adopt as described above. For that reason, if the PRML characteristics are changed, the ways of calculating the signal evaluation index should also be changed according to the PRML characteristic newly adopted.

As described above, by changing the PRML characteristics to adopt depending on what type of operation needs to be done for what purpose (i.e., to make adjustments before a write operation is started, to perform a read operation, or to perform a read operation for rating the signal quality), various types of write parameters, the read performance and various types of read parameters can all be optimized easily. As a result, an optical disk drive that would achieve high write performance, high read performance and good compatibility can be provided.

In the foregoing description of preferred embodiments, PR 1221 ML and PR 12221 ML are supposed to be adopted as exemplary PRML methods. However, the present invention is in no way limited to those specific preferred embodiments. Rather the effects of the present invention would also be achieved equally even if the present invention were carried out with a different combination of PRML methods.

Also, it is not always necessary to perform the test write operation. Instead, the edge shifts may be detected and the write parameters may be corrected based on the information that was collected when a write operation was performed using initial write parameters.

Optionally, the variable PR equalizer 8 may have a finite impulse response (FIR) filter configuration and may control tap coefficients adaptively by the least mean square (LMS) algorithm (see Adaptive Signal Processing Algorithm published by Baifukan Co., Ltd. (Non-Patent Document No. 2)).

Alternatively, the PRML characteristics may also be changed according to the storage density of the given optical disk medium on which information is going to be written. In that case, the same PRML characteristic may be eventually selected in every situation.

Still alternatively, when the PRML characteristics are changed, the optical disk controller 12 may change the equalization characteristics of the waveform equalizer 5. The waveform equalization made by the waveform equalizer 5 contributes to not only maintaining the stability of the PLL by shaping the waveform before it is processed by the PLL 7 but also improving the output characteristic of the variable PR equalizer 8. By changing the waveform equalization characteristics of the waveform equalizer 5 when the PRML characteristics are changed into a treble-boosted one or a non-treble-boosted one, not just can the stability of the PLL be maintained but also can the output characteristic of the variable PR equalizer 8 be improved. If both of these two purposes cannot be achieved at the same time, then two waveform equalizers may be provided for the PLL and for the PRML, respectively. If the PRML methods are changed from PR 1221 ML into PR 12221 ML, then the waveform equalizer for the PLL may have an increased characteristic gain (e.g., have increased amplitude at high frequencies) while the waveform equalizer for PR equalization may have a decreased gain (e.g., have decreased amplitude at high frequencies). Alternatively, only waveform equalization for PLL may be carried out. Still alternatively, the waveform equalizer 5 may be arranged after the A/D converter 6 so as to function as a digital waveform equalizer.

Also, in the foregoing description of preferred embodiments, write parameters that are correlated to edge shifting are supposed to be adjusted. However, the write parameters to adjust are not particularly limited but may also be the leading and trailing edges of a write signal waveform and the height of the write waveform (recording power). That is to say, as long as the edge positions of a mark can be adjusted, any other write parameters may be adjusted. Furthermore, the write parameter to adjust may also be recording power. The mark length can be calculated based on the magnitude and direction of edge shifting and the recording power may be adjusted such that this mark length becomes equal to a predetermined length.

Optionally, the preamplifier 3, the AGC 4 and the waveform equalizer 5 shown in FIG. 1 may be integrated together into a single analog large-scale integrated circuit (LSI). Also, the A/D converter 6, the PLL 7, the variable PR equalizer 8, the variable maximum likelihood decoder 9, the signal evaluation index calculator 10, the edge shifting detector 11, the optical disk controller 12, the pattern generator 13 and the write compensator 14 may be integrated together into a single hybrid (analog and digital) large-scale integrated circuit (LSI). Naturally, this hybrid LSI may further include the preamplifier 3, the AGC 4 and the waveform equalizer 5. The laser driver 15 may be implemented as a single driver LSI and built in the optical head 2 as well.

In the foregoing description of preferred embodiments, the optical disk drive 100 or 200 is supposed to be a read/write system. However, the optical disk drive 100 or 200 may also be a read-only device. In that case, the pattern generator 13 and the write compensator 14 may be omitted. Also, in that case, the servo controller 16 may be included as one of the blocks of the hybrid LSI mentioned above. Furthermore, the servo controller 16 may be added to the optical disk drive 100. Nevertheless, the present invention is not limited to any of these configurations for an optical disk drive but may use another configuration as well.

Also, the write adjustment mode, the read mode and the signal quality rating read mode could be recognized by various access commands such as a write access command, a read access command and a rating access command.

Embodiment 2

Figure 12:
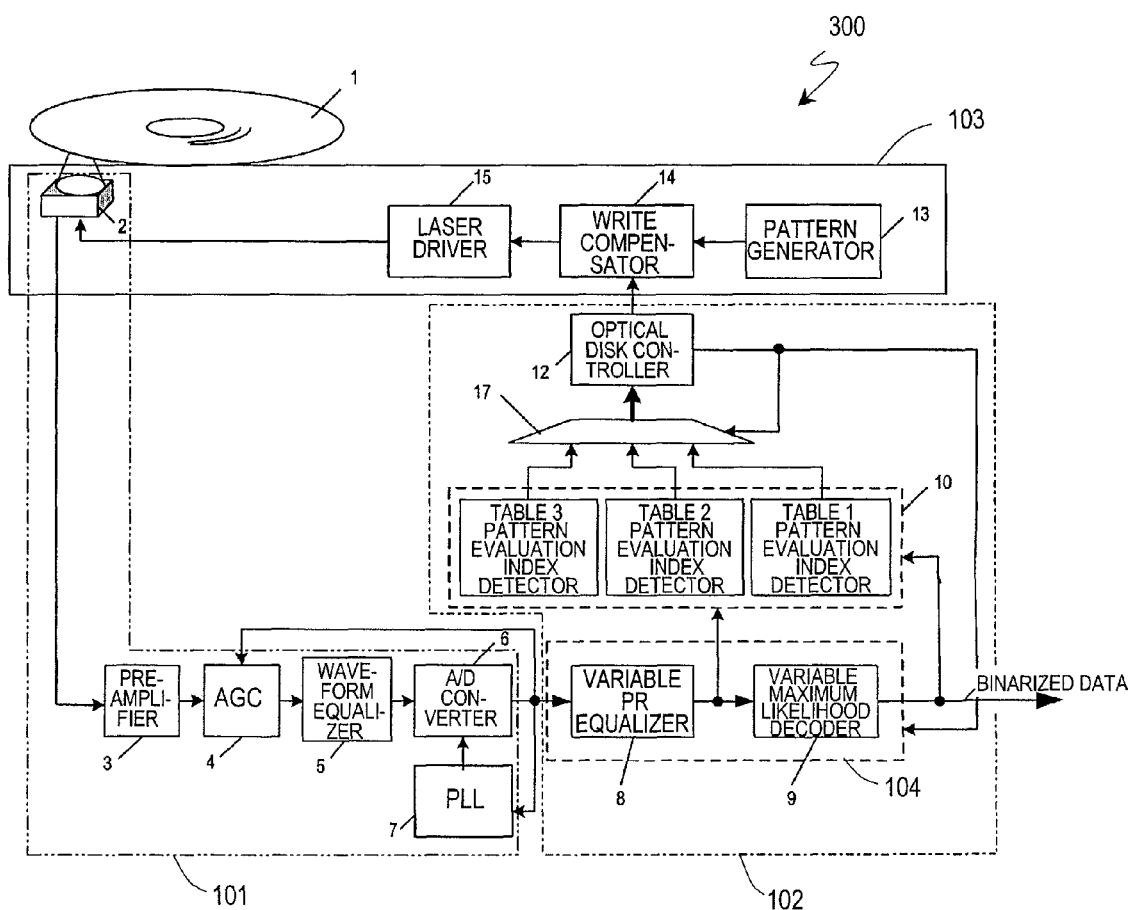
FIG. 12 illustrates an optical disk drive according to still another preferred embodiment of the present invention.

FIG. 12 shows a configuration for an optical disk drive 300 as a second specific preferred embodiment of the present invention. The optical disk drive 300 has the same configuration as the optical disk drive 100 shown in FIG. 1 except that the write condition modifying section 102 includes different components.

The signal evaluation index calculator 10 of this optical disk drive 300 calculates and detects evaluation indices for the patterns shown in respective Tables 1, 2 and 3. That is to say, by calculating those evaluation indices, the signal evaluation index calculator 10 detects the values of those evaluation indices. The optical disk drive 300 further includes a selector 17, which determines which of these results of calculations (and detections) should be output to the optical disk controller 12.

In response to the control signal supplied from the optical disk controller 12, the selector 17 determines which of the patterns shown in Tables 1 to 3 should be output as the results of signal evaluation indices detected. As the case may be, patterns may be selected from either all of Tables 1, 2 and 3 or just one or two of them.

Hereinafter, it will be described how read processing needs to be carried out when write parameters are adjusted for a BD (Blu-ray Disc) with a storage linear density of 33.3 GB per recording layer and how read processing is performed on a normal user area.

The optical disk controller 12 instructs the variable PR equalizer 8 and the variable maximum likelihood decoder 9 of the PRML detecting section 104 to select the PR 12221 ML method. Also, the optical disk controller 12 instructs selector 17 to selectively output only the evaluation indices detected for the patterns shown in Table 1 from the signal evaluation index calculator 10.

The optical disk controller 12 recognizes the results of detection as estimated signal values, thereby rating the signal quality of the read digital signal obtained by reading information from the storage area.

A high-order PRML method such as PR 12221 ML recognizes the waveform of a read signal using a waveform pattern in an even longer interval in order to identify the read signal under the influence of intersymbol interference. Comparing the patterns shown in Tables 2 and 3, which are most commonly mistakable in the PR 12221 ML, to those shown in Table 4, which are most commonly mistakable in the PR 1221 ML, it can be seen that the longer interval is an interval in which two paths that merge with each other in the shortest waveform distance have a long distance (i.e., it takes long for the time K to pass) between them. As used herein, the "waveform distance" represents how far two waveforms, which could be reference waveforms during a Viterbi decoding process, are apart from each other. Also, the most commonly mistakable patterns refer to the patterns of two paths that merge with each other in the shortest waveform distance.

The evaluation patterns shown in Table 2 are patterns in which a 2T signal representing either a 2T mark or a 2T space is isolated, and therefore, have two edges at the leading and trailing edges of the 2T signal (i.e., zero-cross information). The zero-cross information indicates the zero-cross portion of a signal. Since the error of a single piece of zero-cross information cannot be detected separately from a single pattern, it is difficult to adjust the zero-cross portions one by one when the write parameters are adjusted on a mark length basis with attention paid to the zero-cross information.

Meanwhile, the evaluation patterns shown in Table 3 include patterns in which 2T signals appear consecutively and patterns in which a 2T signal is either preceded or followed by a non-2T signal, and have multiple pieces of zero-cross information. Since the error of a single piece of zero-cross information cannot be detected separately from a single pattern, it is difficult to adjust the zero-cross portions one by one when the write parameters are adjusted on a mark length basis with attention paid to the zero-cross information.

The evaluation patterns shown in Table 1 are not most commonly mistakable patterns in the PR 12221 ML but have only a single piece of zero-cross information. In this case, the error of a single piece of zero-cross information can be detected separately from a single pattern. For that reason, it is possible to adjust the zero-cross portions one by one when the write parameters are adjusted on a mark length basis with attention paid to the zero-cross information.

The PR 12221 ML is a PRML method in which multiple pieces of zero-cross information (i.e., a number of zero-cross portions) are included in a merging path of a minimum difference metric. In this preferred embodiment, the signal quality of a read digital signal is calculated by this PR 12221 ML method. In this case, the signal quality is detected by calculating the evaluation index using only a state transition pattern in which only a single piece of zero-cross information is included in a merging path of a non-minimum difference metric. Such a state transition pattern in which only a single piece of zero-cross information is included in a merging path of a non-minimum difference metric belongs to the state transition patterns shown in Table 1. Particularly in an optical disk medium that adopts the mark edge recording method in which each zero-cross portion of a signal has information, it is a very important factor to detect and evaluate these zero-cross portions appropriately in order to evaluate and adjust the quality of the just written area.

The variable PR equalizer 8 and the variable maximum likelihood decoder 9 shown in FIG. 12 do not have to be designed to change the PRML methods, but may be designed to always use the PR 12221 ML, for example.

In rating the quality of a given medium, an index that is most correlated to an error rate (i.e., an index corresponding to a most commonly mistakable pattern) has been used as a signal evaluation index. However, if it is already known that the given pattern is related to the shortest mark as shown in Tables 2 and 3, rating can be done to a certain extent by signal processing. Nevertheless, the point is how to cope with SNR, erasure and archival properties (such as how well the original storage quality is maintained and how resistant it is against erasure even after years of storage), none of which could be dealt with by signal processing. It is determined based on information about zero crossing whether these properties are good or bad. That is why no matter how high-order the PRML method to adopt may be, the storage state is preferably evaluated by selecting a pattern that matches the method of writing on the optical disk medium.

The best PRML method needs to be selected in view of intersymbol interference and decrease in SNR that could occur more and more often as the storage linear density further rises. In this preferred embodiment, the PR 1221 ML method is adopted if the storage linear density is less than a predetermined value. And when information with a storage linear density that is equal to or higher than that value needs to be read, the PR 12221 ML method is adopted.

Hereinafter, the storage linear density of a BD will be described with reference to FIGS. 13 and 14. As in a DVD (digital versatile disc), data is also written on the track 131 of a BD as a series of marks that are produced as a result of a physical variation. The shortest one of this series of marks is the shortest mark 132. In a BD with a storage capacity of 25 GB, the shortest mark 132 has a physical length of 0.149 μm, which is approximately ½.7 of the shortest mark of a DVD. And even if the resolution of a laser beam is increased by changing the parameters of an optical system such as the length (405 nm) and the NA (0.85), this value is still rather close to the limit of optical resolution, below which recording marks are no longer recognizable. It should be noted that both marks and spaces have the shortest length of 2T.

Figure 13:
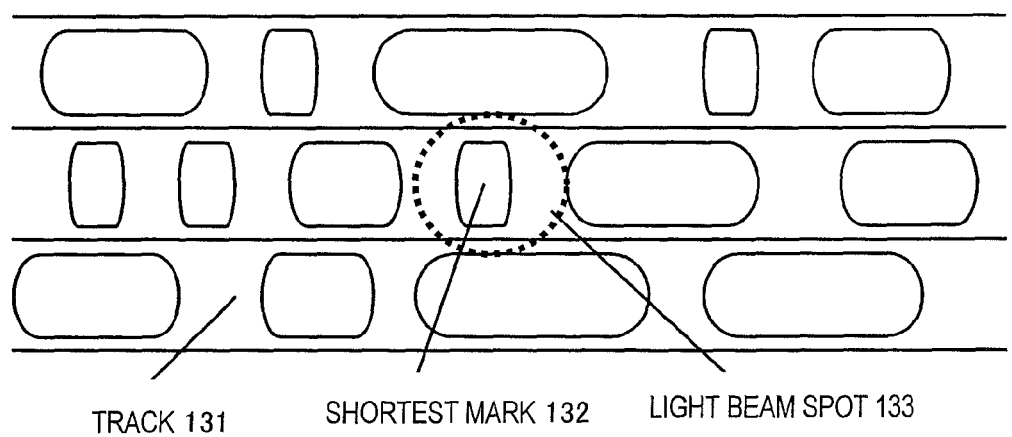
FIG. 13 illustrates a relation between a light beam spot and a series of marks that have been left on the track of an optical disk medium according to a preferred embodiment of the present invention.
Figure 14:
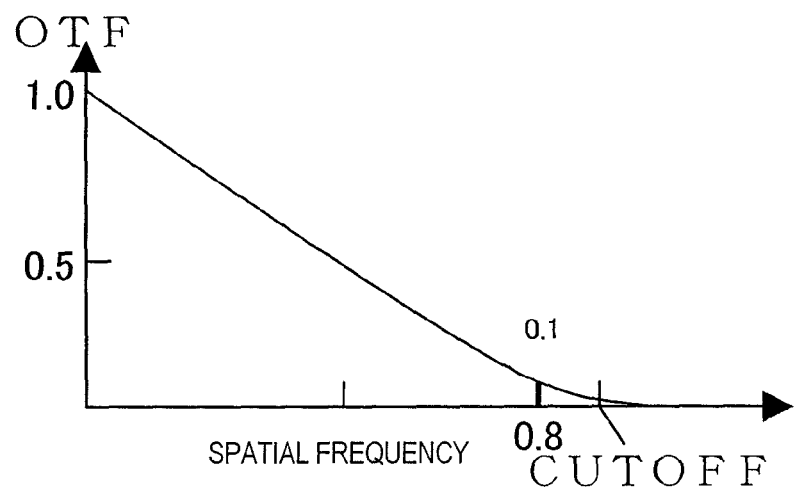
FIG. 14 shows the OTF characteristic of an optical disk medium according to a preferred embodiment of the present invention.

FIG. 13 illustrates a state where a light beam spot 133 has been formed on the series of recording marks on the track 131. In a BD, the light beam spot 133 has a diameter of about 0.39 μm, which may vary with parameters of the optical system. If the storage linear density is increased without changing the structures of the optical system, then the recording marks will shrink for the same spot size and the read resolution will decrease.

The shorter a recording mark, the smaller the amplitude of a read signal to be generated when the recording mark is scanned with a light beam. And the amplitude goes zero when the mark length gets equal to the limit of optical resolution. The inverse number of one period of these recording marks is called a "spatial frequency" and a relation between the spatial frequency and the signal amplitude is called an "optical transfer function (OTF)". As the spatial frequency rises, the signal amplitude decreases almost linearly. And the readable limit at which the amplitude goes zero is called an OTF cutoff. FIG. 14 shows how the OTF of a BD with a storage capacity of 25 GB changes with the shortest recording mark length. The spatial frequency of the shortest mark on a BD is 80% of, and is rather close to, the OTF cutoff frequency (i.e., a spatial frequency at which the OTF cutoff occurs). Also, a read signal representing the shortest mark has amplitude as small as approximately 10%. The storage linear density at which when the shortest mark on a BD is read, the OTF cutoff occurs (i.e., the storage linear density at which the read signal has almost no amplitude) corresponds to approximately 31 GB in a BD.

When the spatial frequency of the shortest mark comes close to, or exceeds, the OTF cutoff frequency, the limit of optical resolution may have been reached or even surpassed. As a result, the read signal comes to have decreased amplitude and the SNR drops steeply.

The storage density at which the PRML methods are changed from the PR 1221 ML into the PR 12221 ML, or vice versa, may be a storage linear density of 31 GB on a BD, for example. Also, the storage linear density at which the spatial frequency of the shortest mark is equal to the OTF cutoff frequency calculates 31.8 GB. That is why the PRML methods are preferably changed between PR 1221 ML and PR 12221 ML when the linear density is still smaller than 31.8 GB.

The storage linear density to change the PRML methods needs to be determined by taking not just the resolution of a laser beam but also an SNR, representing the storage property of a medium, into consideration fully, and may be either lower or higher than 31 GB.

The information recording medium 1 has a storage linear density of 31 GB or more per recording layer and may be equal to or higher than 31.8 GB. The storage linear density per recording layer may be approximately 33.3 GB, for example. The information recording medium 1 may include three or more recording layers, the total storage linear density of which becomes approximately equal to 100 GB.

It should be noted that the PRML method described above is just an example and the present invention is in no way limited to that example. Instead, any other PRML method may be selected according to the given storage linear density.

As described above, in an optical disk medium that adopts the mark edge recording method in which each zero-cross portion of a signal has information, it is a very important factor to detect and evaluate those zero-cross portions appropriately in order to evaluate and adjust the quality of the just written area. Hereinafter, an exemplary signal evaluation method that uses those zero-cross portions will be described.

The signal evaluation index calculator 10 of the optical disk drive 300 shown in FIG. 12 calculates and detects the Table 1 pattern evaluation indices (which are signal evaluation indices of the patterns shown in Table 1). And the results of detection are classified according to the combination of mark and space lengths. As a result of that classification, the degree of edge shifting and SNR of each pattern are known. For example, the calculation represented by Equation (1) that has already been described for the first preferred embodiment of the present invention may be made and results of those calculations may be used as indices of a distribution similar to jitter's.

FIG. 15 shows the distribution of results of those signal evaluation index calculations represented by Equation (1) on the patterns shown in Table 1 (i.e., the distribution of index D values). In FIG. 15, the abscissa represents the D value calculated by Equation (1) and the ordinate represents its frequency of occurrence. According to the PR 12221 ML method, the square of d in Equation (1) is 14.

FIG. 15($a$) shows a distribution, of which the average is approximately equal to zero and which has a relatively small standard deviation $\sigma$. This is an example in which the quality of the read signal is good. On the other hand, FIG. 15($b$) shows a distribution, which has a relatively small standard deviation $\sigma$ but of which the average has shifted. This is an example in which that pattern has caused edge shifting. And FIG. 15($c$) shows a distribution, of which the average is approximately equal to zero but which has a relatively large standard deviation $\sigma$. This is an example in which the edges of that pattern have a poor SNR. If the signal quality is analyzed separately for every possible combination of mark and space lengths by these evaluation methods, the quality of recording marks that have been left on the optical disk medium can be rated accurately. In the signal quality rating processing, at least one of the degree of SNR of a read digital signal and the degree of edge shifting is determined by the signal quality calculated. The degree of edge shifting of a read digital signal can be determined by the average of a distribution of quality rating index values calculated. On the other hand, the degree of SNR of the read digital signal can be determined by the standard deviation of a distribution of quality rating index values calculated.

And a write operation may be performed with write parameters changed according to those results of evaluation such that the edge shift and SNR improve for every possible combination of mark and space lengths. In this case, the improvement of edge shift means bringing the average of the distribution as close to zero as possible. On the other hand, the improvement of SNR means reducing the standard deviation $\sigma$. For example, the optical disk controller 12 may receive the results of evaluation from the signal evaluation index calculator 10, determine which write parameters should be changed, and then output the modified parameters to the write compensator 14. The write parameters include recording power parameters and write pulse position parameters. Optionally, the servo parameters described above, including focus position parameters, spherical aberration position parameters and tracking position parameters, may be optimized based on these results of evaluation.

The evaluation may be carried out in any way. That is to say, the edge shift and SNR may be estimated either separately or collectively. Or the evaluation may also be done with the results of calculations classified on a pattern-by-pattern basis.

The target of these estimated values needs to be set within a range in which a sufficient system margin can be afforded. If the variance of D calculated by Equation (1) is normalized with TW (which is the square of 2×d), it can be used as an estimated value correlated to the error rate. For example, the evaluation may be carried out with a target set on an element-by-element basis and with a total target index value supposed to be 10%. Specifically, evaluation may be done with the target value of edge shifting defined to be 4.3%. Alternatively, the evaluation may also be done with the target value of SNR defined to be 9%.

Embodiment 3

Figure 16:
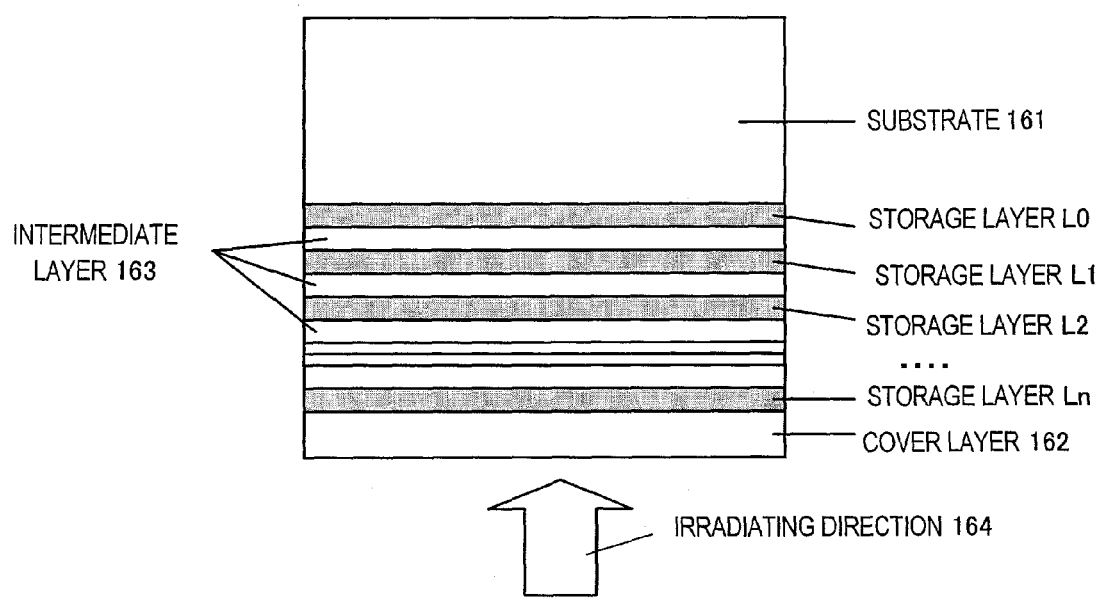
FIG. 16 illustrates an optical disk medium with multiple recording layers according to a preferred embodiment of the present invention.

Next, an information recording medium will be described as a third preferred embodiment of the present invention. FIG. 16 illustrates an information recording medium 1 according to this preferred embodiment. The information recording medium 1 is supposed to be loaded into the optical disk drive 100, 200 or 300 described above.

FIG. 16 illustrates a multilayer phase-change type thin film disk medium as an exemplary information recording medium 1. However, the recording medium may also be a single layer disk medium with only one recording layer. The information recording medium 1 shown in FIG. 16 includes a number n (which is an integer that is equal to or greater than two) of recording layers. The information recording medium 1 includes a coating layer (protective coating) 162, recording layers Ln through L0, and a polycarbonate substrate 161, which are stacked in this order over the light source of a laser beam 2$a$ (see FIG. 1). Also, between each pair of adjacent recording layers Ln through L0, interposed is an intermediate layer 163, which functions as an optical buffering member. The substrate 161 may have a thickness of 1.1 mm, for example. The coating layer (protective coating) 162 may have a thickness of 10 μm to 200 μm, which is preferably 100 μm or less.

The direction 164 in which the laser beam 2a (see FIG. 1) travels is the direction in which the optical head 2 faces toward the coating layer 162 of the information recording medium 1. That is to say, the laser beam 2a enters the information recording medium 1 through the coating layer 162 of the information recording medium 1.

It has been proposed that the overall storage capacity of a single information recording medium be increased by adopting such a multilayer structure with the storage capacity of each layer maintained. Such multilayer storage, however, could have various influences on the read operation. For example, as the balance in transmittance cannot be optimized due to the presence of multiple recording layers, the reflectance could decrease. In addition, as the thickness of the intermediate layers needs to be reduced, crosstalk would increase between the recording layers to cause a decrease in SNR. Furthermore, stray light could be produced due to the structure of the optical head, thus further decreasing the SNR. That is why development of a method for measuring these SNR quantitatively is awaited.

According to the evaluation method that uses the patterns shown in Table 2 or 3, an estimated value correlated to the error rate can be certainly obtained. Depending on the write condition, however, the SNR components could not be estimated appropriately. As described above, the patterns shown in Table 2 or 3 have either an isolated pattern of a 2T signal or a repetitive pattern of 2T signals. The PR 12221 ML is a reading method in which the 2T signal is expected to be read with zero amplitude (which is the center level of a waveform). That is why even in a write state with no edge shifting and a good SNR, when a read signal waveform in which a 2T signal will have significantly varied DC level (i.e., an asymmetric waveform) is evaluated, the evaluation index is significantly affected by the variation in DC level. For that reason, if the patterns shown in Table 2 or 3 are adopted, the influence of the SNR could not be evaluated accurately when an asymmetric waveform needs to be evaluated. Therefore, according to the present invention, by making evaluations using the patterns shown in Table 1 as described above, the properties of the given medium or optical head can be evaluated properly.

In the foregoing description, a problem of a medium with a multilayer structure and the effects of the present invention that can contribute to resolving such a problem have been discussed. However, the present invention can also be used effectively even in evaluating a single-layer medium with only one recording layer. On top of that, the present invention is applicable to evaluating not just a recordable information recording medium but also a ROM (read only memory) type information recording medium as well.

Hereinafter, a method of making an information recording medium according to this preferred embodiment of the present invention will be described with reference to FIGS. 17 and 18.

Figure 17:
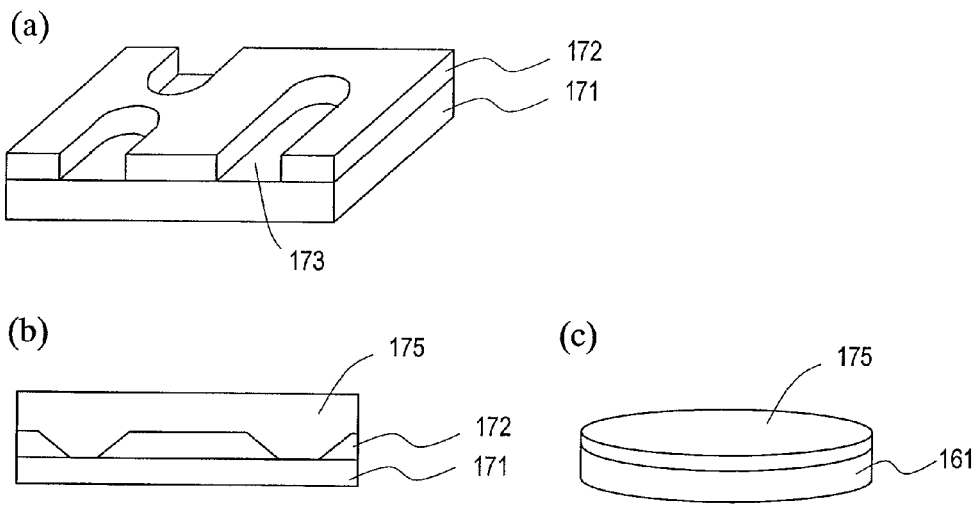
FIG. 17 illustrates a manufacturing process of an information recording medium as a preferred embodiment of the present invention.

FIG. 17 illustrates a manufacturing process of the information recording medium 1, which includes a mastering process step to make a stamper (press mold) for forming a substrate and a replication process step to form the substrate with the stamper.

FIG. 17(a) illustrates a glass master 171 on which a resist pattern 172 has been formed. The resist pattern 172 with recesses 173 can be obtained by depositing a liquid photoresist on the surface of the glass master 171 by a spin coating process, exposing the resist to radiation and then developing it.

In forming a stamper to make a ROM type information recording medium, the recesses 173 will make pits eventually. On the other hand, in forming a stamper to make a write-once or rewritable information recording medium, the recesses 173 will make grooves in the end. Furthermore, in forming a stamper to make an information recording medium with both pits and grooves, the recesses 173 will make both pits and grooves finally. That is to say, the information recording medium should have pits and/or grooves. Optionally, the recesses 173 may also be protrusions. By arranging such protrusions and recesses, either concentric tracks or a spiral track can be formed on the information recording medium.

Next, as shown in FIG. 17(b), the glass master 171 with the resist pattern 172 is plated with a metal such as Ni, thereby forming a metallic plating layer 175, which is then removed from the glass master 171. The metallic plating layer 175 thus removed is used as a stamper 175, on which the patterns to make pits or grooves have been transferred.

Thereafter, as shown in FIG. 17(c), the patterns of the stamper 175 to make pits or grooves are transferred onto a molten plastic material by an injection molding process, for example, thereby obtaining a substrate 161 with pits or grooves.

Finally, recording layers, intermediate layers, a coating layer and other layers are formed on the substrate 161 thus obtained, thereby completing the information recording medium 1.

The information recording medium 1 thus obtained is rated by an evaluation method that uses the patterns shown in Table 1. If a ROM type information recording medium needs to be rated, the shape of the pits on the stamper 175 is adjusted as needed to produce a better read signal. The shape of the pits can be adjusted by modifying the shape of portions of the resist pattern to be exposed to the radiation.

Figure 18:
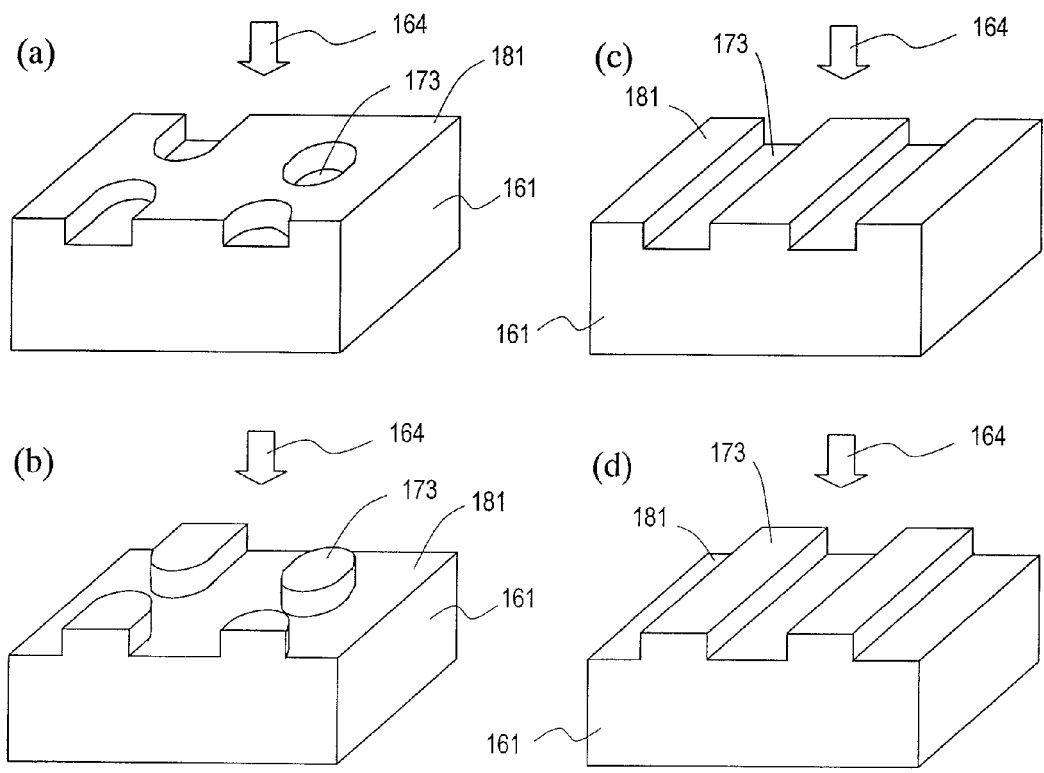
FIG. 18 illustrates pits and grooves that have been formed on an information recording medium according to a preferred embodiment of the present invention.

FIG. 18 illustrates pits and grooves that have been formed on the information recording medium 1. Only the substrate 161 of the information recording medium 1 is illustrated in FIG. 18 for the sake of simplicity.

The pits 173 shown in FIG. 18(a) are used in an in-pit read method, and are depressed as viewed from the light source of the laser beam to irradiate the information recording medium 1 with. The arrow 164 indicates the direction in which the laser beam is coming. The raised portions 181 other than the depressed pits 173 are lands.

The pits 173 shown in FIG. 18(b) are used in an on-pit read method, and are raised as viewed from the light source of the laser beam to irradiate the information recording medium 1 with. The depressed portions 181 other than the raised pits 173 are lands.

The grooves 173 shown in FIG. 18(c) are used in an in-groove read/write method, and are depressed as viewed from the light source of the laser beam to irradiate the information recording medium 1 with. The raised portions 181 other than the depressed grooves 173 are lands. Those grooves 173 form land portions and groove portions on the substrate 161. The groove portions are located more distant from the light source of the laser beam to irradiate the information recording medium 1 than the land portions are. In writing information on the information recording medium 1, marks are formed at locations corresponding to the groove portions of its recording layer.

The grooves 173 shown in FIG. 18(d) are used in an on-groove read/write method, and are raised as viewed from the light source of the laser beam to irradiate the information recording medium 1 with. The depressed portions 181 other than the raised grooves 173 are lands. Those grooves 173 form groove portions and land portions on the substrate 161. The groove portions are located closer to the light source of the laser beam to irradiate the information recording medium 1 than the land portions are. In writing information on the information recording medium 1, marks are formed at locations corresponding to the groove portions of its recording layer.

By determining, with the patterns shown in Table 1, whether a predetermined type of read signal has a good SNR or not on a ROM type information recording medium or a recordable information recording medium that has been manufactured as described above, the property of the given medium can be rated appropriately. Also, if information storage media are manufactured while being rated by the evaluation method described above, the quality can be kept at least equal to an intended one, and a good read/write quality can be maintained for the information storage media that have been put on the market.

Embodiment 4

Another method for rating the storage quality of a given information recording medium will be described.

An evaluation index that uses a particular pattern according to the PR 12221 ML has been described as an exemplary evaluation index to rate the quality of data that is stored on an information recording medium. However, the present invention is in no way limited to this method. Hereinafter, another storage quality rating method that will be effectively applicable to a situation where the storage linear density is increased will be described.

Figure 19:
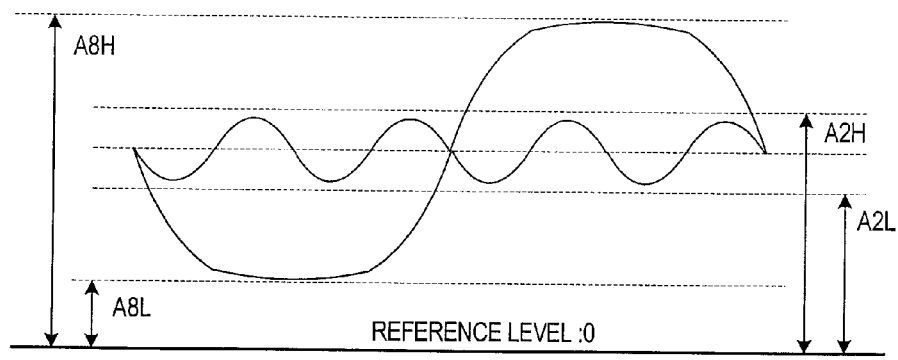
FIG. 19 shows the read signal amplitude levels of the longest mark and space (8T) and the shortest mark and space (2T) in a preferred embodiment of the present invention.

As indices that define the storage quality, there are an asymmetric evaluation index and a β evaluation index. FIG. 19 shows the read signal amplitude levels of the longest mark and space (8T) and the shortest mark and space (2T) and also shows how to define a parameter for calculating the asymmetric evaluation index values. In an information recording medium of which the reflectance is lower in its written area than in its unwritten area, the amplitude level of an 8T space is defined to be A8H as measured from a reference level 0, the amplitude level of an 8T mark is defined to be A8L as measured from the reference level 0, the amplitude level of a 2T space is defined to be A2H as measured from the reference level 0, and the amplitude level of a 2T mark is defined to be A2L as measured from the reference level 0. In that case, the value of the asymmetric evaluation index ASYM can be calculated by the following Equation (4):

$$ASYM = \frac{\frac{A8H + A8L}{2} - \frac{A2H + A2L}{2}}{A8H - A8L} \qquad (4)$$

By using this index ASYM, it can be determined how much DC error the center of amplitude of the shortest mark or space (2T) or that of the longest mark or space (8T) has caused with respect to the entire amplitude of the longest mark or space (8T). To keep the storage quality equal to or higher than an intended one, a limitation is imposed on a write operation such that the asymmetric evaluation index ASYM has a value falling within a predetermined range. For example, $-0.1 \leq ASYM \leq 0.1$ should be satisfied.

However, as the storage linear density rises, the spatial frequency of the shortest mark may soon reach the vicinity of, or even exceed, the OTF cutoff frequency. In that case, the limit of optical resolution will be surpassed, and the read signal may have decreased amplitude or may be less than the reference level due to the influence of intersymbol interference as described above.

Figure 20:
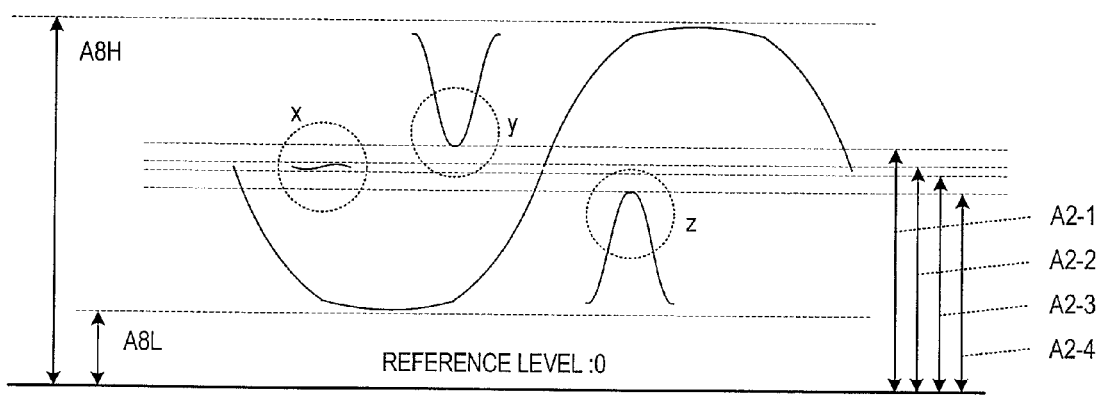
FIG. 20 shows the read signal amplitude levels of the longest mark and space (8T) and the shortest mark and space (2T) in a preferred embodiment of the present invention.

FIG. 20 shows the read signal amplitude levels of the longest mark and space (8T) and the shortest mark and space (2T) shown in FIG. 19. More particularly, FIG. 20 shows read signal amplitude levels when an area of a BD with a storage density of 33 GB is scanned. In the area x, the shortest mark and space (2T) have almost no read signal amplitude level due to the OTF cutoff. This is a read signal amplitude level when an area where 2T marks and 2T spaces appear consecutively is scanned. In the two other areas y and z, there is almost no read signal amplitude, either, due to the intersymbol interference. These are read signal amplitude levels when either an area with an 8T space, a 2T mark and an 8T space or an area with an 8T mark, a 2T space and an 8T mark is scanned. If the storage linear density is increased in this manner, there are multiple read signal amplitude levels such as A2-2 and A2-4 corresponding to the amplitude level A2H of the 2T signal shown in FIG. 19. Likewise, there are multiple read signal amplitude levels such as A2-1 and A2-3 corresponding to the amplitude level A2L of the 2T signal shown in FIG. 19. That is why the asymmetric evaluation index value cannot be calculated.

Figure 21:
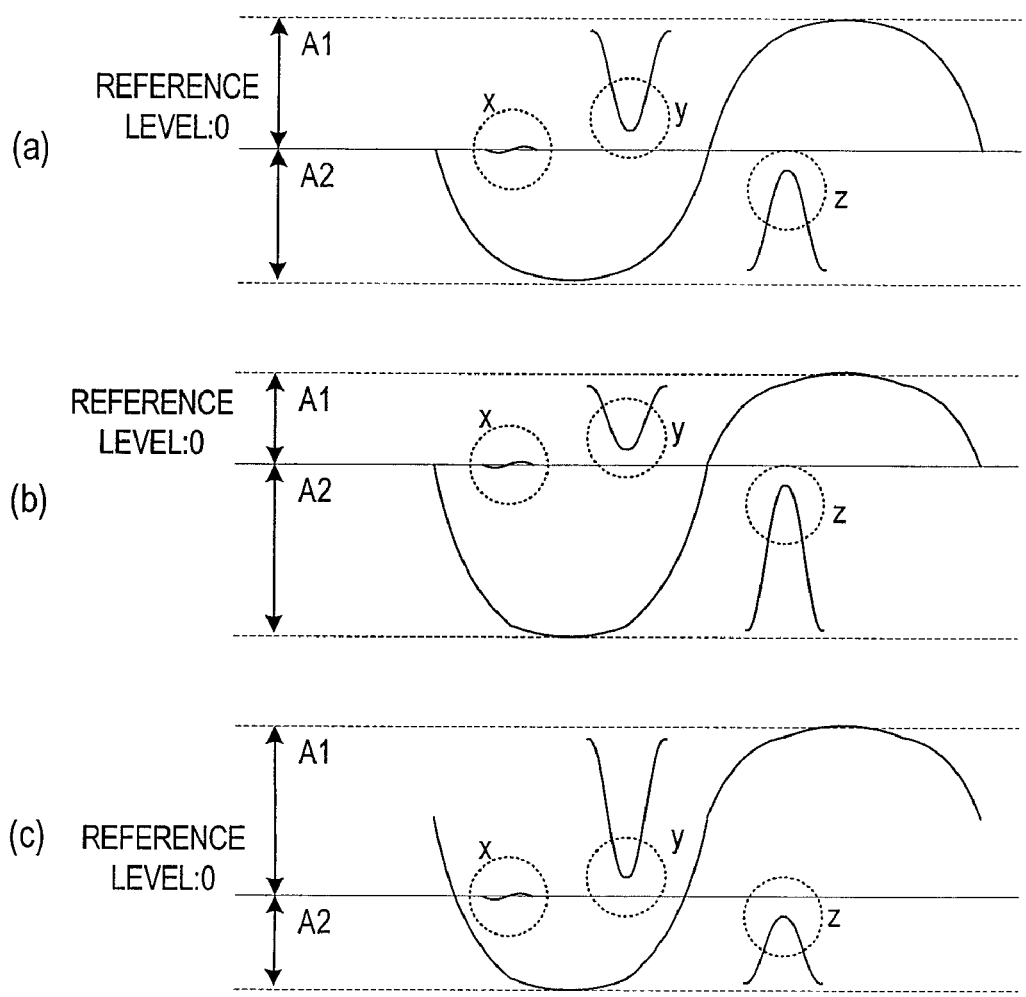
FIG. 21 shows the read signal amplitude levels of the longest mark and space (8T) and the shortest mark and space (2T) in a preferred embodiment of the present invention.

FIGS. 21(a), 21(b) and 21(c) show the read signal amplitude levels of the longest mark and space (8T) and the shortest mark and space (2T) and define a parameter for calculating a β evaluation index value. In an information recording medium of which the written area has a lower reflectance than the unwritten area thereof, the amplitude level of the 8T space is defined to be A1 as measured from the reference level 0, and the amplitude level of the 8T mark is defined to be A2 as measured from the reference level 0. The reference level 0 is the center of energy of the read signal waveform, which could be located by making the signal pass through a high pass filter (HPF) with a predetermined bandwidth. The value of the β evaluation index (β) can be calculated by the following Equation (5):

$$\beta = \frac{A1 + A2}{A1 - A2} \qquad (5)$$

With this β index value, it can be determined how much DC error the center level of the energy has caused with respect to the entire amplitude of the longest mark and space (8T).

FIG. 21(a) shows a situation where the mark and space have substantially equal signal amplitudes with respect to the reference level. The β index value is calculated zero by Equation (5).

On the other hand, FIG. 21(b) shows what the waveform will be like if an area where information was written with lower recording power than in FIG. 21(a) is scanned. In that case, the mark has a larger signal amplitude than the space with respect to the reference level and a β index value with negative sign is calculated by Equation (5).

Furthermore, FIG. 21(c) shows what the waveform will be like if an area where information was written with higher recording power than in FIG. 21(a) is scanned. In that case, the mark has a smaller signal amplitude than the space with respect to the reference level and a β index value with positive sign is calculated by Equation (5).

As described above, the β index is correlated to the amplitude of the signal to be generated when an area where information has been written with varied recording power is scanned, and therefore, used as a target value for regulating the recording power (see Japanese Patent Application Laid-Open Publication No. 9-161272).

The β index is defined as the ratio of the center of a signal amplitude, associated with a combination of the longest mark and the longest space on an information recording medium, to the center of energy of a read signal waveform. Also, the β index value is an evaluation index for measuring the amplitude ratio of the longest mark to the longest space with respect to the center of the entire energy of a read signal waveform. That is why this index is not affected by any decrease in the amplitude of the shortest mark to be caused by an increase in storage density, and therefore, can be used to rate the quality of a given signal.

In reading the data stored, unless the center of amplitude of the shortest mark falls within a predetermined range of the entire amplitude of the longest mark or space (8T), sometimes the data signal cannot be demodulated and the compatibility of the optical disk drive cannot be maintained consistently. Particularly, in a system of which the storage quality is defined by a jitter index, the read/write state needs to result in a 2T signal with amplitude that is equal to or greater than a predetermined value. For example, in a BD with a storage linear density of 25 GB, the property of the medium is defined by a jitter value that has been obtained with a limit equalizer. To define the storage quality of a 2T mark or space, an asymmetric estimated value with respect to the DC of a 2T signal should be defined to be equal to or smaller than a predetermined value. As such a jitter measuring index that uses a limit equalizer is disclosed in Non-Patent Document No. 1 (Illustrated Blu-ray Disc Reader, Ohmsha, Ltd.), a detailed description thereof will be omitted herein.

At a storage linear density at which the spatial frequency of the shortest mark reaches the vicinity of, or even exceeds, the OTF cutoff frequency, such a jitter measuring index that uses a limit equalizer cannot be used. The jitter measuring index is effective only if the 2T signal has amplitude that is equal to or greater than a predetermined value. For that reason, it would be meaningless to use an asymmetric index value that uses the amplitude of a 2T signal as a reference.

As for the method of reading a recording mark that has been written with such a storage linear density at which the spatial frequency of the shortest mark reaches the vicinity of, or even exceeds, the OTF cutoff frequency, it would be effective to adopt a high-order PRML method described above such as the PR 12221 ML method. This is a read method that does not expect a 2T signal to have a predetermined amplitude with the influence of intersymbol interference taken into account, and therefore, the amplitude of a 2T signal does not count for this method. According to the PRML method, however, when a waveform, of which the marks and spaces have significantly different amplitude ratios, is read, the read performance may sometimes deteriorate. This is because the PRML method is a method for decoding a read signal waveform on the supposition that the marks and spaces are symmetric to each other. That is why there is no need to define its symmetry with respect to the amplitude of a 2T signal. However, by defining the mark-space ratio (β) to be equal to or smaller than a predetermined value with respect to the center of energy of the entire waveform, appropriate storage quality can be maintained for the PRML method. For example, by defining β such that $-0.2 \leq \beta \leq 0.2$ is satisfied, appropriate storage quality can be maintained.

In a range in which the jitter evaluation index is effective (i.e., in a storage linear density range in which the spatial frequency of the shortest mark is sufficiently lower than the OTF cutoff frequency), an information recording medium with consistent storage quality can be provided by using an asymmetric evaluation index that defines the amplitude of a 2T signal as a reference to rate the storage quality.

On the other hand, in a range in which the jitter evaluation index is not effective (i.e., in a storage linear density range in which the evaluation index of PR 12221 ML can be used effectively and at which the spatial frequency of the shortest mark reaches the vicinity of, or even exceeds, the OTF cutoff frequency), an information recording medium with consistent storage quality can be provided by using a β index value that defines the center of energy of the entire waveform as a reference to rate the storage quality.

It should be noted that the storage quality depends heavily on not only the recording power concerning the asymmetric index or the β index but also the waveshape of the write pulse wave. The storage quality that has something to do with the shape of the write pulse waveform can be rated by using either the jitter index or the evaluation index for the PR 12221 ML method. By defining the storage quality of an information recording medium by a numerical value and rating the quality of a signal by an appropriate method according to the storage linear density in this manner, the compatibility of an optical disk drive can be maintained consistently.

The present invention can be used particularly effectively in a field of technology in which signal processing is carried out by maximum likelihood decoding.

What is claimed is:

1. A method for rating an information recording medium, the method comprising the steps of:
   receiving a digital read signal, which has been generated based on an analog read signal representing information that has been read from the information recording medium, and shaping the waveform of the digital read signal;
   subjecting the shaped digital read signal to maximum likelihood decoding, thereby generating a binarized signal showing a result of the maximum likelihood decoding; and
   calculating the quality of the digital read signal based on the shaped digital read signal and the binarized signal,
   wherein the quality is calculated by a PRML method in which a number of zero-cross portions are included in a merging path of a minimum difference metric, and the quality is calculated further by using:
   a state transition pattern in which only one zero-cross portion is included in a merging path of a non-minimum difference metric;
   a state transition pattern in which only one isolated pattern with a minimum mark length is included in the merging path of the minimum difference metric; and
   a state transition pattern in which at least two repetitive patterns with the minimum mark length are included in the merging path of the minimum difference metric.

2. An apparatus for reading and/or writing information from/on an information recording medium, comprising: an optical head for reading and/or writing information from/on the information recording medium; and an optical disk controller configured to rate the information recording medium by the method of claim 1.

* * * * *